United States Patent
Oka

(10) Patent No.: US 9,830,560 B2
(45) Date of Patent: Nov. 28, 2017

(54) BILLING MANAGEMENT SYSTEM, IMAGE PROCESSING APPARATUS, BILLING CONTROL METHOD AND RECORDING MEDIUM

(75) Inventor: Tetsuya Oka, Osaka (JP)

(73) Assignee: Konica Minolta, Inc., Tokyo (JP)

(*) Notice: Subject to any disclaimer, the term of this patent is extended or adjusted under 35 U.S.C. 154(b) by 1922 days.

(21) Appl. No.: 12/353,079

(22) Filed: Jan. 13, 2009

(65) Prior Publication Data
US 2010/0067036 A1  Mar. 18, 2010

(30) Foreign Application Priority Data

Sep. 18, 2008  (JP) ................... 2008-239528

(51) Int. Cl.
- *G06Q 10/00* (2012.01)
- *G06Q 30/02* (2012.01)
- *G06Q 30/04* (2012.01)

(52) U.S. Cl.
CPC ......... *G06Q 10/00* (2013.01); *G06Q 30/0283* (2013.01); *G06Q 30/04* (2013.01)

(58) Field of Classification Search
None
See application file for complete search history.

(56) References Cited

U.S. PATENT DOCUMENTS

| | | | | |
|---|---|---|---|---|
| 7,028,895 | B2* | 4/2006 | Ashaari | 235/385 |
| 2006/0114494 | A1* | 6/2006 | Crosby et al. | 358/1.15 |
| 2010/0158547 | A1* | 6/2010 | Carling et al. | 399/27 |

FOREIGN PATENT DOCUMENTS

| | | |
|---|---|---|
| JP | 2002-067451 | 3/2002 |
| JP | 2002-304274 | 10/2002 |
| JP | 2006-134046 | 5/2006 |
| KR | 2003-0061883 | 7/2003 |
| WO | 2006/057807 A2 | 6/2006 |

OTHER PUBLICATIONS

European Search Report issued in corresponding European Application No. 09150610.5 dated Jun. 13, 2016 (4 pages).
EP Search Report dated Jun. 17, 2009, directed to counterpart EP Application No. 09 15 0610;8 pages.

* cited by examiner

*Primary Examiner* — Shay S Glass
(74) *Attorney, Agent, or Firm* — Osha Liang LLP

(57) ABSTRACT

Before executing a job, a printer performs an estimation of a billing amount with use of a simplified billing table, and if the estimated billing amount exceeds a balance, execution of the job is cancelled, and if within the balance, the job is executed. After the job is finished, the printer judges whether the estimated billing amount is correct according to detailed job information and a detailed billing table. If an error exists, the printer corrects the error and performs the correct billing.

22 Claims, 30 Drawing Sheets

IMAGE PROCESSING APPARATUS

BILLING MANAGEMENT SERVER

LAN1

CLIENT APPARATUS

FIG.7

| USER ID | PASSWORD | BALANCE (YEN) |
|---|---|---|
| 1 | faegege5 | 10020 |
| 2 | hifuoeojg | 1750 |
| 3 | gewgjowg | 73140 |
| ... | | |

FIG.8

| FUNCTION | BILLING PARAMETER | | UNIT PRICE (YEN) |
|---|---|---|---|
| COPY/PRINT | SHEET SIZE | A4 | 10 |
| | | B5 | 10 |
| | COLOR MODE | MONOCHROME | 10 |
| | | FULL COLOR | 20 |
| FAX TRANSMISSION | | | 30 YEN/PAGE |

FIG.9

| FUNCTION | BILLING PARAMETER | | UNIT PRICE (YEN) |
|---|---|---|---|
| COPY/PRINT | SHEET SIZE | A3 | 20 |
| | | A4 | 10 |
| | | A5 | 10 |
| | | A6 | 10 |
| | | B4 | 30 |
| | | B5 | 10 |
| | | B6 | 10 |
| | SHEET TYPE | PLAIN PAPER | 0 |
| | | OHP SHEET | 30 |
| | COLOR MODE | MONOCHROME | 10 |
| | | 2-TONE COLOR | 15 |
| | | FULL COLOR | 20 |
| | DUPLEX/SIMPLEX | SIMPLEX | 0 |
| | | DUPLEX | 5 |
| | IMAGE QUALITY | LOW | −5 |
| | | NORMAL | 0 |
| | | HIGH | 10 |
| | TONER USE AMOUNT | C | 4 YEN/10 MG |
| | | M | 4 YEN/10 MG |
| | | Y | 4 YEN/10 MG |
| | | K | 2 YEN/10 MG |
| FAX TRANSMISSION AND RECEPTION | SHEET SIZE | A3 | 10 |
| | | A4 | 0 |
| | | A5 | 0 |
| | | A6 | 0 |
| | | B4 | 10 |
| | | B5 | 0 |
| | | B6 | 0 |
| | COLOR MODE | MONOCHROME | 0 |
| | | TWO-TONE COLOR | 50 |
| | | FULL COLOR | 100 |
| | IMAGE QUALITY | LOW | −5 |
| | | NORMAL | 0 |
| | | HIGH | 10 |
| | FAX TRANSMISSION TIME | | 10 YEN/ 6 SECONDS |

FIG.10

| USER ID | 1 |
|---|---|
| JOB TYPE | PRINT |
| SHEET SIZE | A4 |
| COLOR MODE | MONOCHROME |
| SHEET TYPE | NORMAL PAPER |
| PER-PAGE BILLING AMOUNT (YEN) | 20 |
| PAGE COUNT | 2 |

FIG.11

| USER ID | 1 |
|---|---|
| JOB TYPE | PRINT |
| START TIME | 18:02:00 |
| END TIME | 18:02:30 |
| SHEET TYPE | OHP |
| SHEET SIZE | A4 |
| PAGE COUNT | 2 |
| COLOR MODE | MONOCHROME |
| SIMPLEX/DUPLEX | SIMPLEX |
| IMAGE QUALITY | NORMAL |
| TONER USE AMOUNT C (mg) | 0 |
| TONER USE AMOUNT M (mg) | 0 |
| TONER USE AMOUNT Y (mg) | 0 |
| TONER USE AMOUNT K (mg) | 108 |

FIG.12

| USER ID | | 1 |
|---|---|---|
| CLICK INFORMATION | JOB TYPE | PRINT |
| | SHEET SIZE | A4 |
| | COLOR MODE | MONOCHROME |
| | SHEET TYPE | NORMAL PAPER |
| | PER-PAGE BILLING AMOUNT (YEN) | 20 |
| | PAGE COUNT | 2 |
| SIMPLIFIED BILLING AMOUNT (YEN) | | 40 |
| JOB LOG INFORMATION | JOB TYPE | PRINT |
| | START TIME | 18:02:00 |
| | END TIME | 18:02:30 |
| | SHEET TYPE | OHP |
| | SHEET SIZE | A4 |
| | PAGE COUNT | 2 |
| | COLOR MODE | MONOCHROME |
| | SIMPLEX/DUPLEX | SIMPLEX |
| | IMAGE QUALITY | NORMAL |
| | TONER USE AMOUNT C (mg) | 0 |
| | TONER USE AMOUNT M (mg) | 0 |
| | TONER USE AMOUNT Y (mg) | 0 |
| | TONER USE AMOUNT K (mg) | 108 |

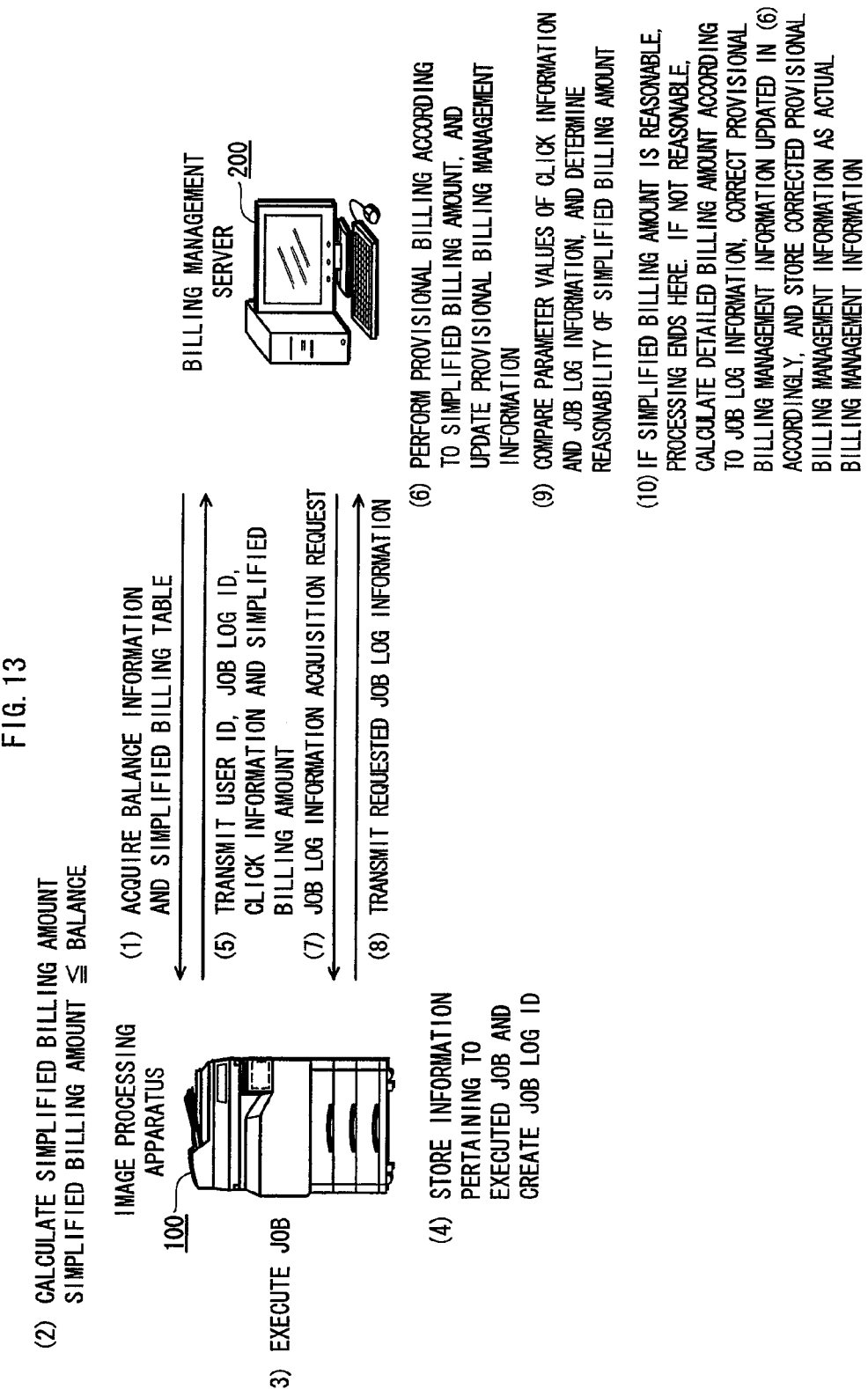

FIG.18

| USER ID | | 2 |
|---|---|---|
| JOB LOG ID | | 3 |
| CLICK INFORMATION | JOB TYPE | COPY |
| | START TIME | 19:02:00 |
| | END TIME | 19:02:05 |
| | SHEET SIZE | B5 |
| | COLOR MODE | MONOCHROME |
| | SHEET TYPE | NORMAL PAPER |
| | PER-PAGE BILLING AMOUNT (YEN) | 20 |
| | PAGE COUNT | 1 |
| SIMPLIFIED BILLING AMOUNT (YEN) | | 20 |

FIG.25

| SERVICE TYPE | BILLING PARAMETER | | UNIT PRICE (YEN) |
|---|---|---|---|
| CONVERSION TO EXCEL | SHEET SIZE | A4 | 10 |
| | | B5 | 10 |
| | COLOR MODE | MONOCHROME | 50 |
| CONVERSION TO WORD | SHEET SIZE | A4 | 10 |
| | | B5 | 10 |
| | COLOR MODE | MONOCHROME | 30 |

FIG.26

| SERVICE TYPE | BILLING PARAMETER | | UNIT PRICE (YEN) |
|---|---|---|---|
| CONVERSION TO EXCEL | SHEET SIZE | A3 | 20 |
| | | A4 | 10 |
| | | A5 | 5 |
| | | A6 | 5 |
| | | B4 | 20 |
| | | B5 | 10 |
| | | B6 | 5 |
| | COLOR MODE | COLOR | 100 |
| | | MONOCHROME | 50 |
| CONVERSION TO WORD | SHEET SIZE | A3 | 20 |
| | | A4 | 10 |
| | | A5 | 5 |
| | | A6 | 5 |
| | | B4 | 20 |
| | | B5 | 10 |
| | | B6 | 5 |
| | COLOR MODE | COLOR | 60 |
| | | MONOCHROME | 30 |

FIG.27

| FUNCTION | INFORMATION | | |
|---|---|---|---|
| SCAN | SHEET INFORMATION | SHEET SIZE | A4 |
| | PRINT INFORMATION | COLOR MODE | MONOCHROME |
| | | SIMPLEX/DUPLEX | SIMPLEX |
| | PER-PAGE BILLING AMOUNT (YEN) | | 20 |
| CONVERSION TO EXCEL (EXTERNAL SERVICE) | SHEET INFORMATION | SHEET SIZE | A4 |
| | PRINT INFORMATION | COLOR MODE | MONOCHROME |
| | PER-PAGE BILLING AMOUNT (YEN) | | 60 |

FIG.28

| JOB LOG ID | 2 |
|---|---|
| EXTERNAL SERVICE PROVIDING SERVER | www. abc. co. jp |
| SERVICE TYPE | CONVERSION TO EXCEL |
| SHEET SIZE | A4 |
| COLOR MODE | COLOR |
| PAGE COUNT | 1 |

FIG.29

| USER ID | | 1 |
|---|---|---|
| JOB LOG INFORMATION | START TIME | 18:02:00 |
| | END TIME | 18:04:05 |
| | COLOR MODE | COLOR |
| | SHEET SIZE | A4 |
| | PAGE COUNT | 1 |
| SERVICE LOG INFORMATION | EXTERNAL SERVICE PROVIDING SERVER | www.abc.co.jp |
| | SERVICE TYPE | CONVERSION TO EXCEL |
| | SHEET SIZE | A4 |
| | COLOR MODE | COLOR |
| | PAGE COUNT | 1 |

BILLING MANAGEMENT SYSTEM, IMAGE PROCESSING APPARATUS, BILLING CONTROL METHOD AND RECORDING MEDIUM

This application is based on application No. 2008-239528 filed in Japan, the content of which is hereby incorporated by reference.

BACKGROUND OF INVENTION

1. Field of the Invention

The present invention relates to technology for billing a job executed by an image processing apparatus.

2. Description of Related Art

Conventionally, to perform billing calculation and billing management of an image processing job executed by an image processing apparatus such as an MFP (Multifunction Peripheral) or the like, a billing table (a file structured as a table in which various items to be billed during billing calculation are correlated with parameter values indicating respective billing amounts) is downloaded from a billing management server to the image processing apparatus, and billing calculation is performed by the image processing apparatus according to the billing table, either before executing the job, or in parallel with the execution of the job. This enables stopping execution of the job in advance, for example before a number of pages to be printed exceeds a budget, and preventing execution of a job that would exceed the budget.

Also, Japanese Patent Application Publication No. 2002-67451 discloses a method for acquiring information indicating a number of pages printed or a use amount of a consumable product such as toner by the image processing apparatus, transmitting the acquired information via e-mail to the billing management server after the job is executed, and performing billing according to the information.

As image processing apparatuses such as MFPs become more highly powered and highly functioning, settings to be determined by a user when executing an image processing job also become more detailed and multi-branched. Accordingly, the quantities and types of information used for billing calculation of the image processing job increase, and the file size of the billing table also increases. As a result, when conventional billing calculation is performed in parallel with execution of the job, the load on the CPU is increased and the processing time is lengthened. When the image processing apparatus is equipped with a high-powered CPU to solve this problem, increased cost is an issue.

On the other hand, to perform accurate billing according to detailed information pertaining to the image processing job, while suppressing the increased load on the CPU and lengthened processing time, billing calculation can be performed, as in Patent Document 1, after execution of the job rather than in parallel with the execution of the job. However, when this method is used, management cannot be performed in advance to keep the billing amount within a budget, and there is a risk of executing an image processing job that greatly exceeds the amount that can be paid by the user.

SUMMARY OF INVENTION

The present invention has been achieved in view of the above issues, and an aim thereof is to provide a billing management method, billing management apparatus, image processing apparatus, and billing management system that can quickly judge whether a billing amount is within the range of a balance, and perform detailed and exact billing in the end, while suppressing an increased cost.

The above aim is achieved by:

a billing management system including an image processing apparatus that executes an image processing job and a billing management server that performs billing of the image processing job according to a first billing table, the image processing apparatus being connected to the billing management server via a network, the image processing apparatus including: a balance acquisition part operable to acquire a balance from the billing management server; a job execution part operable to execute the image processing job; a second billing table acquisition part operable to acquire a second billing table that is simpler than the first billing table; a provisional fee calculation part operable to, before or during execution of the image processing job, calculate a provisional fee required for executing the image processing job, according to the second billing table; a canceller operable to compare the balance and the provisional fee, and to cancel the image processing job if a judgment is made as a result of the comparison that the image processing job cannot be executed within the balance; and a transmitter operable to transmit, to the billing management server, information for calculating a fee pertaining to the image processing job, and the billing management server including: a receiver operable to receive, from the image processing apparatus, the information pertaining to the executed job; an actual fee calculation part operable to calculate an actual fee according to the received information pertaining to the executed job, with reference to the first billing table; an updater operable to update the balance according to the actual fee calculated by the actual fee calculation part, thus generating an updated balance; and a memory operable to store therein the updated balance, an image processing apparatus that executes an image processing job, in a billing management system including the image processing apparatus and a billing management server that performs billing, with reference to a first billing table, of the image processing job executed by the image processing apparatus, the image processing apparatus being connected to the billing management server via a network, including: a balance acquisition part operable to acquire a balance from the billing management server; a job execution part operable to execute the image processing job; a second billing table acquisition part operable to acquire a second billing table that is simpler than the first billing table; a provisional fee calculation part operable to, before or during execution of the image processing job, calculate a provisional fee required for executing the image processing job, according to the second billing table; a canceller operable to compare the balance and the provisional fee, and to cancel the image processing job if a judgment is made as a result of the comparison that the image processing job cannot be executed within the balance; and a transmitter operable to transmit, to the billing management server, information for calculating a fee pertaining to the image processing job, a billing control method executed by an image processing apparatus that executes an image processing job, in a billing management system including the image processing apparatus and a billing management server that performs billing, with reference to a first billing table, of the image processing job executed by the image processing apparatus, the image processing apparatus being connected to the billing management server via a network, the billing control method including: a balance acquisition step for acquiring a balance from the billing management server; a second billing table acquisition step for acquiring a second billing table that is simpler than the first billing table; a provisional fee calculation step for, before or during execution of the image processing job, calculating a provisional fee required for executing the image processing job, according to the second billing table; a canceling step for comparing the balance and the provisional fee, and canceling the image processing job if a judgment is made as a result of the comparison that the image processing job cannot be executed within the balance; and a transmitting step for transmitting, to the billing management server, information for calculating a fee pertaining to the image processing job, a recording medium on which has been recorded a billing management program executed by an image processing apparatus that executes an image processing job, in a billing management system including the image processing apparatus and a billing management server that performs billing, with reference to a first billing table, of the image processing job executed by the image processing apparatus, the image processing apparatus being connected to the billing management server via a network, the billing management program causing the following processing to be executed on a computer in the image processing apparatus: balance acquisition processing for acquiring a balance from the billing management server; second billing table acquisition processing for acquiring a second billing table that is simpler than the first billing table; provisional fee calculation processing for, before or during execution of the image processing job, calculating a provisional fee required for executing the image processing job, according to the second billing table; canceling processing for comparing the balance and the provisional fee, and canceling the image processing job if a judgment is made as a result of the comparison that the image processing job cannot be executed within the balance; and transmitting processing for transmitting, to the billing management server, information for calculating a fee pertaining to the image processing job, an image processing apparatus that performs billing of an executed image processing job, including: a job execution part operable to execute the image processing job; a memory operable to store therein a balance; a table storage operable to store a first billing table and a second billing table that is simpler than the first billing table; a canceller operable to, before or during execution of the image processing job, calculate a provisional fee required to execute the image processing job according to the second billing table, compare the balance and the provisional fee, and cancel the image processing job if a judgment is made as a result of the comparison that the image processing job cannot be executed within the balance; and an updater operable to, when the image processing job has been executed, obtain an actual fee for the executed image processing job according to the first billing table, and update the balance in the memory, a billing control method for billing an image processing job executed by an image processing apparatus that holds a first billing table and a second billing table that is simpler than the first billing table, including: a balance acquisition step for acquiring a balance; a provisional fee calculation step for calculating a provisional fee before or during execution of the image processing job; a canceling step for canceling execution of the image processing job if a judgment is made as a result of the comparison that the image processing job cannot be executed by a user within the balance of the user; an actual fee calculation step for, when the image processing job has been executed, calculating an actual fee of the image processing job that has been executed, according to the first billing table; and an update step for updating a balance according to the calculated actual fee, and a recording medium on which is recorded a billing management program for billing an image processing job executed by an image processing apparatus that stores a first billing table and a second billing table that is simpler than the first billing table, the billing management program causing the following processing to be executed on a computer: balance acquisition processing for acquiring a balance; provisional fee calculation processing for calculating a provisional fee before or during execution of the image processing job; canceling processing for canceling execution of the image processing job if a judgment is made as a result of the comparison that the image processing job cannot be executed by a user within the balance of the user; actual fee calculation processing for, when the image processing job has been executed, calculating an actual fee of the image processing job that has been executed, according to the first billing table; and update processing for updating a balance according to the calculated actual fee.

BRIEF DESCRIPTION OF THE DRAWINGS

These and other objects, advantages and features of the invention will become apparent from the following description thereof taken in conjunction with the accompanying drawings, which illustrate specific embodiments of the present invention.

In the drawings:

FIG. 7 is an exemplary user billing management table;

FIG. 8 is an exemplary simplified billing table;

FIG. 9 is an exemplary detailed billing table;

FIG. 10 shows exemplary click information;

FIG. 11 shows exemplary job log information;

FIG. 12 shows exemplary notification information transmitted from an image processing apparatus 100 to a billing management server 200 after a job is finished, according to embodiment 1;

FIG. 13 is a schematic diagram of a flow of billing management processing according to embodiment 2;

FIG. 18 shows exemplary notification information transmitted from the image processing apparatus to the billing management server after the job is finished, according to embodiment 2;

FIG. 25 is an exemplary simplified billing table for external services;

FIG. 26 is an exemplary detailed billing table for external services;

FIG. 27 shows exemplary click information according to embodiment 3;

FIG. 28 shows exemplary service log information;

FIG. 29 shows exemplary notification information transmitted from the image processing apparatus to the billing management server after the print job is finished, according to embodiment 3.

DESCRIPTION OF PREFERRED EMBODIMENTS

The following describes preferred embodiments of the present invention.

Embodiment 1

1-1. Overall Structure.

Figure 1:
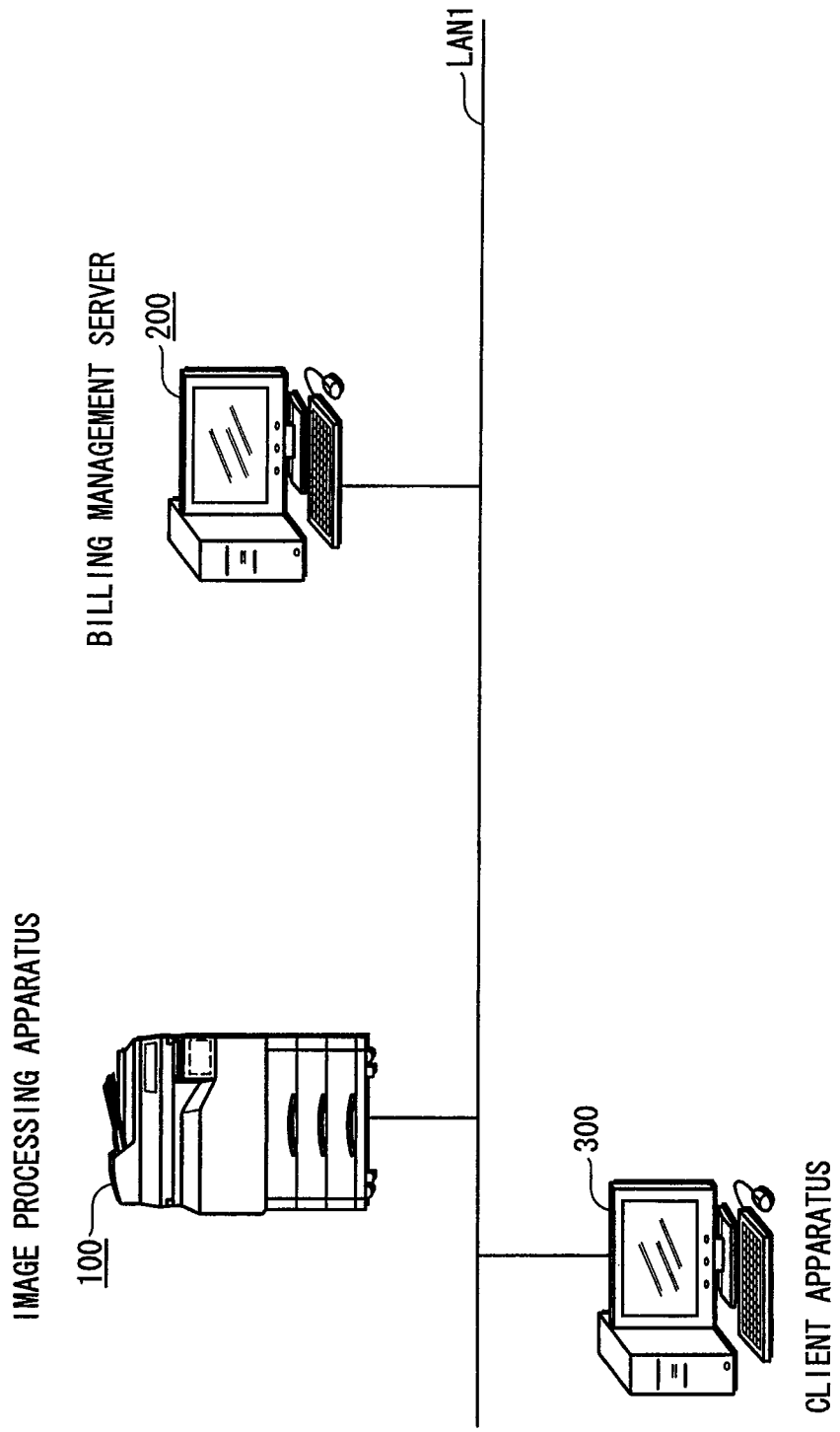
FIG. 1 shows a general structure of an image processing system according to embodiments 1 and 2.

FIG. 1 shows a general structure of a billing management system (hereinafter referred to simply as a "system") pertaining to embodiment 1 of the present invention.

As shown in FIG. 1, the system includes an image processing apparatus 100, a billing management server 200 and a client apparatus 300, which are provided in the office of a user, etc., and are connected via a LAN (Local Area Network) 1.

The image processing apparatus 100 is an MFP that includes a printer function, a copy-function, a fax function, and a scan function.

The client apparatus 300 is constituted from a personal computer, and issues a command to the image processing apparatus 100 to perform processing (hereinafter referred to as a "print job") for printing text, images, etc. created with use of installed application software on a sheet.

1-2. Structure of the Image Processing Apparatus 100

Figure 2:
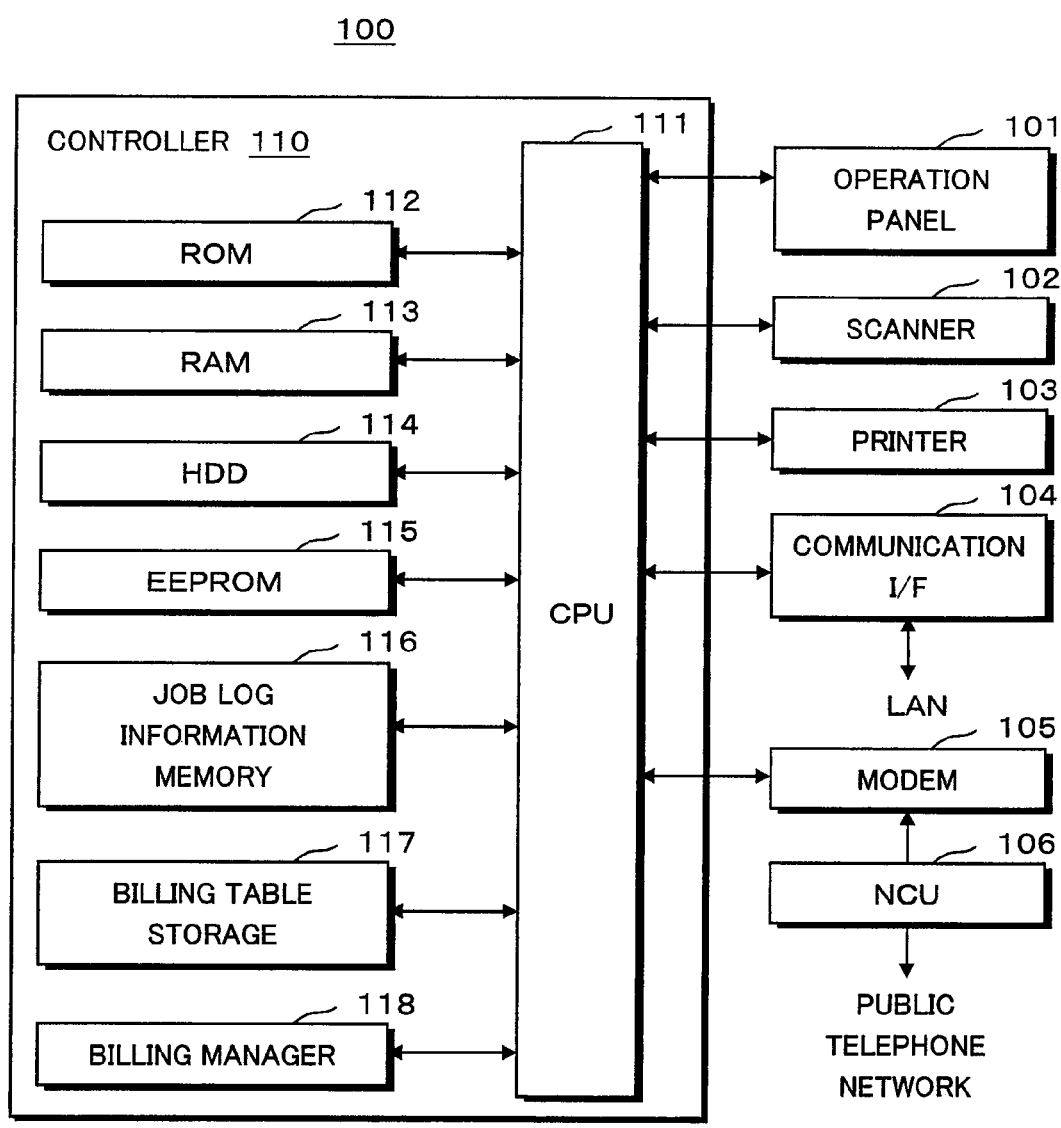
FIG. 2 is a schematic block diagram of a controller in an image processing apparatus.

FIG. 2 is a block diagram of a schematic structure of the image processing apparatus 100. As shown in FIG. 2, the image processing apparatus 100 includes an operation panel 101, a scanner 102, a printer 103, a communication interface (I/F) 104, and a modem 105, each of which is connected to a controller 110.

The operation panel 101 provides a job input interface to the user, and displays job progress states, error messages, etc.

The scanner 102 scans an image of a manuscript, converts light reflected from the manuscript surface into an image signal, and reads image data from the manuscript.

The printer 103 is constituted from an image formation apparatus that uses a known electrophotographic method, for example. The printer 103 executes print jobs received via the communication I/F 104 from a client apparatus such as an external PC, etc., and forms images on a sheet from image data read by the scanner 102 and fax data received via the modem 105, described later.

The communication I/F 104 is an interface for connecting to the LAN, and is constituted from a LAN card and a LAN board.

The modem 105 is connected via an NCU (Network Control Unit) 106 to a public telephone network or the like, and performs transmission and reception of FAX data between desired destinations.

The controller 110 includes, as main constituent elements, a CPU (Central Processing Unit) 111, a ROM (Read Only Memory) 112, a RAM (Random Access Memory) 113, a permanent storage apparatus (HDD: Hard Disk Drive) 114, an EEPROM (Electrically Erasable and Programmable Read Only Memory) 115, a job log information memory 116, a billing table storage 117, a billing manager 118, etc.

Various programs for controlling the operations executed by the image processing apparatus 100 are stored in the ROM 112. The CPU 111 reads necessary programs from the ROM 112, and causes various jobs to be executed smoothly by timing the operations of the scanner 102 and the printer 103, etc. while performing unified control thereof.

The RAM 113 is a main memory that functions as a work area for the CPU 111 when performing data calculations, modifications, etc.

The HDD 114 stores data in file format. Also, the HDD 114 is used as a swap area for data that exceeds the processing capacity of the RAM 113.

The EEPROM 115 temporarily stores billing tables, user balance information, etc. downloaded from the billing management server 200.

The job log information memory 116 stores "job log information" that is detailed information pertaining to an image processing job executed by the image processing apparatus 100.

The billing table storage 117 stores billing tables.

The billing manager 118 calculates a billing amount for the image processing job executed by the image processing apparatus 100, and correlates the billing amount with the user's login information and user ID.

Note that the functions of the job log information memory 116 and the billing table storage 117 need not be fulfilled by stand-alone devices, and may instead be fulfilled by the EEPROM 115 or the HDD 114.

1-3. Structure of the Billing Management Server 200.

Figure 3:
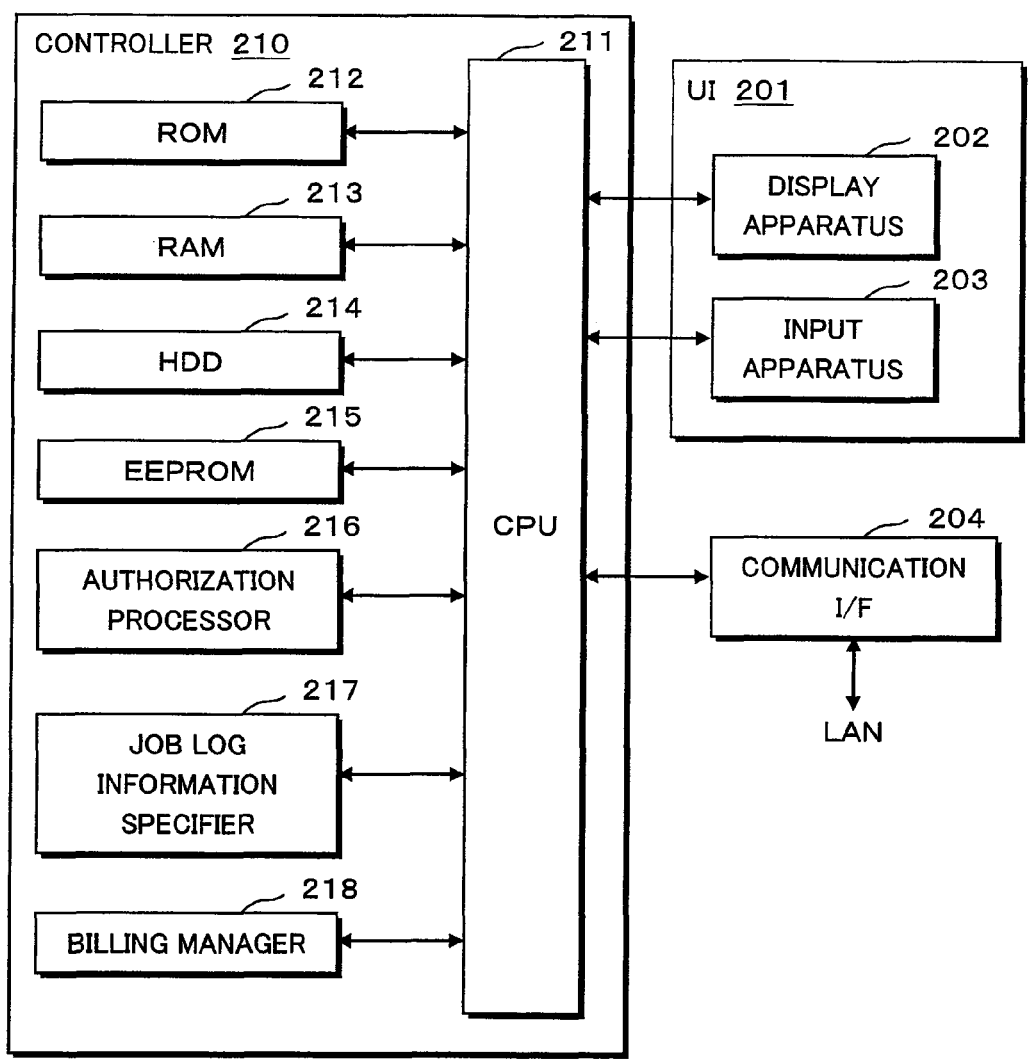
FIG. 3 is a schematic block diagram of a controller in a billing management server.

FIG. 3 is a block diagram of an overall structure of a controller in the billing management server 200. As shown in FIG. 3, the billing management server 200 includes a user interface (UI) 201, a communication I/F 204, etc., each of which is connected to a controller 210.

The UI 201 is constituted from a display apparatus 202 and an input apparatus 203. In cases such as when an administrator views billing information, or adds, deletes or corrects billing parameters, the display apparatus 202 displays billing information and the input apparatus 203 provides a data input interface.

The communication I/F 204 transmits job log information, user IDs, etc., to, and receives job log information, user IDs, etc. from the image processing apparatus 100 via a network such as the LAN 1.

The controller 210 includes, as main constituent elements, a CPU 211, a ROM 212, a RAM 213, an HDD 214, an EEPROM 215, an authorization processor 216, a job log information specifier 217, a billing manager 218, etc.

Application programs necessary for billing calculations, billing management, etc. are stored in the ROM 212. The CPU 211 reads and starts up the programs when necessary. The RAM 213 is used as the work area of the CPU 211.

The EEPROM 215 temporarily stores information pertaining to image processing jobs and billing information transmitted by the image processing apparatus 100, and also temporarily stores balance information calculated according to the information pertaining to image processing jobs and the billing information.

A user billing management table that correlates user IDs to passwords and balances as shown in FIG. 7, and an application program necessary for user authentication processing are stored in a memory. When a user logs in, the authorization processor 216 reads and starts up the program, then performs user authentication processing by referencing the user ID and password and checking whether there is a match. Also, information such as a job execution history, a billing history, or a login history of a user may be added as user billing management information.

The job log information specifier 217 specifies job log information corresponding to a targeted job ID (identification information such as numbers or symbols assigned for identifying individual pieces of job log information) from among a plurality of job log information pieces transmitted from the image processing apparatus, and extracts the specified job log information.

The billing manager 218 performs billing calculation for jobs executed by each user, and stores and manages billing information such as balances and billing histories for the respective users.

Note that the functions of the authorization processor 216, the job log information specifier 217, and the billing manager 218 need not be fulfilled by stand-alone devices, and may instead be fulfilled by combining one or a plurality of the devices of the ROM 212, the RAM 213, the HDD 214, and the EEPROM 215.

1-4. Overview of Billing Management Processing

Figure 4:
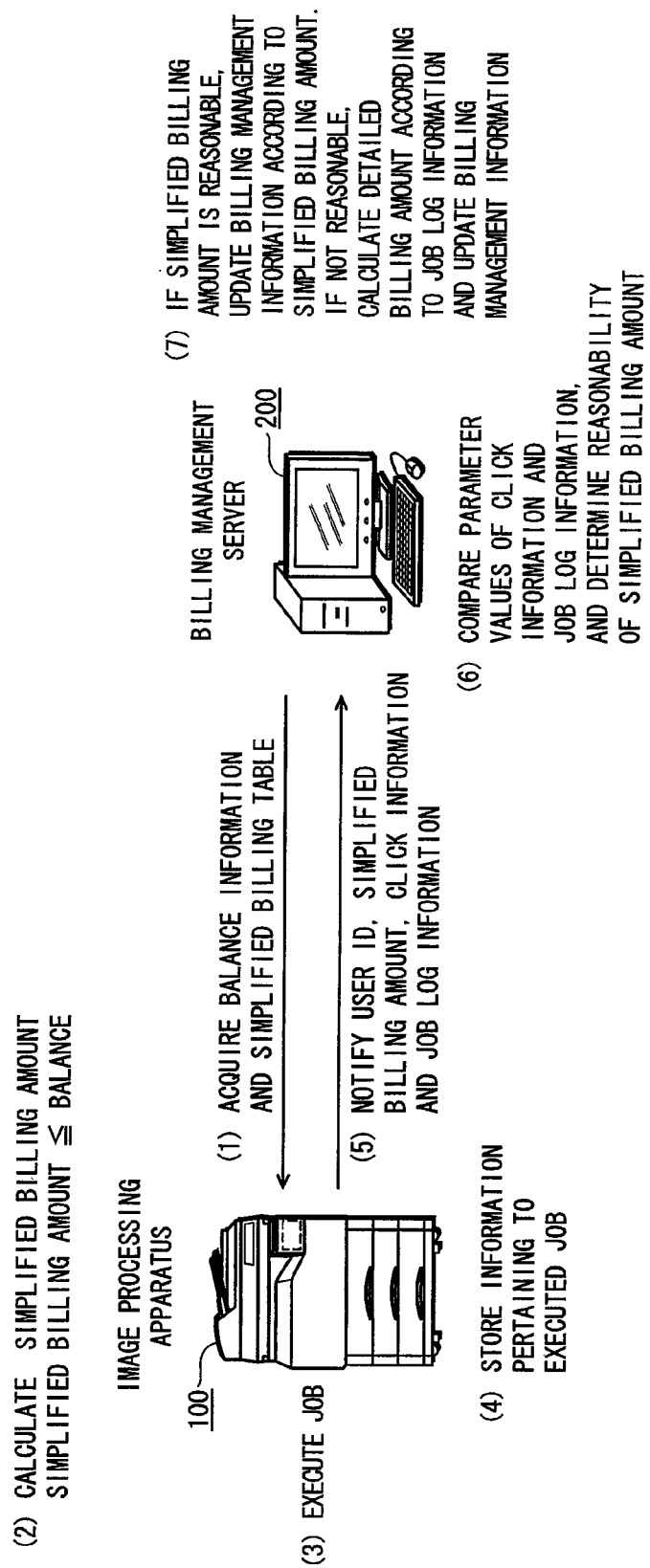
FIG. 4 is a schematic diagram of a flow of billing management processing according to embodiment 1.

FIG. 4 is a schematic diagram of a flow of billing management processing according to the present embodiment. Note that here, a "simplified billing table" is a simple billing table listing only limited billing items for calculating whether the billing amount is within the range of the balance before executing the job. A "simplified billing amount" refers to a billing amount calculated according to the simplified billing table and "click information" (information including job setting information input by the user, a per-page simplified billing amount calculated with use of the simplified billing table according to the job setting information, and information acquired by the image processing apparatus 100 pertaining to a number of processed pages). In contrast, a billing table that includes billing information for detailed items is referred to as a "detailed billing table", and a billing amount calculated according to the detailed billing table and the job log information is referred to as a "detailed billing amount".

(1) First, when the user logs in by inputting a user ID and a password, the image processing apparatus 100 downloads, from the billing management server 200, the user's balance and the simplified billing table, shown in FIG. 8, for the user.

(2) The image processing apparatus 100 calculates the simplified billing amount according to the acquired simplified billing table and the click information.

(3) If the simplified billing amount is within the balance, the image processing apparatus 100 executes the job.

(4) The image processing apparatus 100 stores information pertaining to the executed job.

(5) When execution of the job is finished, the image processing apparatus 100 notifies the user ID, the click information, the simplified billing amount, and the job log information to the billing management server 200.

(6) The billing management server 200 updates the billing management information according to the received simplified billing amount, thus creating updated billing management information, and temporarily stores the updated billing management information. Furthermore, the billing management server 200 compares the parameter values of the acquired click information and job log information, and determines whether the simplified billing amount is reasonable in view of the actual conditions of the job.

(7) If the result of the determination is that the simplified billing amount is reasonable, the billing management server 200 stores the billing management information updated according to the simplified billing amount. If the result of the determination is that the simplified billing amount is not reasonable, the billing management server 200 calculates a detailed billing amount according to the job log information, returns or collects an amount of difference between the calculated detailed billing amount and the simplified billing amount, corrects the billing management information according to the amount of difference, and stores the corrected billing management information.

1-5. Job Processing Performed by the Image Processing Apparatus 100

Figure 5:
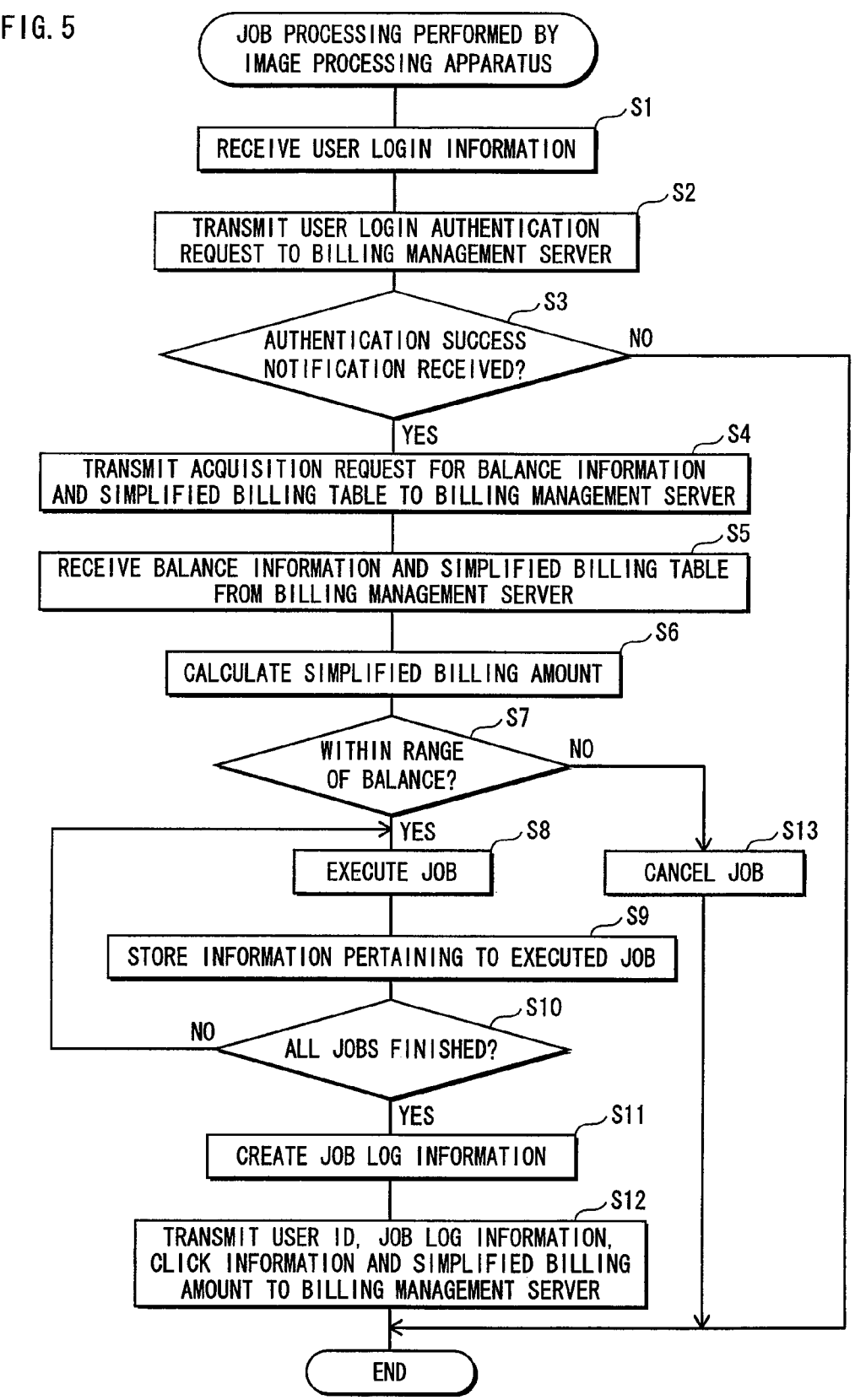
FIG. 5 is a flowchart showing job processing performed by the image processing apparatus according to embodiment 1.

FIG. 5 is a flowchart showing job processing performed by the image processing apparatus 100 according to embodiment 1.

First, the image processing apparatus 100 receives the login information (the user ID and the password) of the user input via either the operation panel 101 (see FIG. 2) of the image processing apparatus 100 or the input apparatus 202 (see FIG. 3) of the client apparatus 300, and transmits the user login information and a login authorization request to the billing management server 200 (step S1, step S2). Then login authorization processing is performed by the billing management server 200, and the image processing apparatus 100 is notified as to whether the authorization was successful. If the authorization was successful, the image processing apparatus 100 receives an authorization success notification transmitted by the billing management server 200 (step S3:YES), notifies, to the billing management server 200, a request for acquiring the balance information of the user and the simplified billing table for that user, and downloads the balance information and the simplified billing table from the billing management server 200 (step S4, step S5).

Next, the image processing apparatus 100 calculates the simplified billing amount according to the downloaded simplified billing table and the click information (step S6), and determines whether the simplified billing amount is within the range of the balance (step S7). If the simplified billing amount is within the range of the balance, the job is executed (step S7:YES, step S8), and detailed information pertaining to the executed job is stored (step S9). Here, the stored detailed information pertaining to the job includes image quality, sheet type, sheet size, duplex/simplex, color mode, toner use amount, fax transmission time, etc. Note that one page worth of toner use amount can be obtained by counting, with use of a dot counter, a number of dots in one line at the time of printing, accumulating this number for a number of lines on one page, and multiplying this result by a per-dot toner use amount, for example.

Thereafter, a determination is made as to whether all jobs are finished. If all jobs are finished, job log information is created (step S10:YES, step S11). If not all of the jobs are finished, remaining jobs are executed (step S10:NO, step S8). Steps S8 to S10 are repeated until all jobs are finished. Here, a determination is made that not all jobs are finished when, for example, an identical document is faxed to a plurality of addresses, and there is an address to which the document has not yet been transmitted.

Lastly, the image processing apparatus 100 transmits the user ID, the click information, and the job log information to the billing management server 200 (step S12), and ends the job processing.

If login authorization fails in step S3 (if the authorization success notification is not received) (step S3:NO), processing ends. Note that alternatively, user login authorization failure information may be created as job log information, transmitted to the billing management server 200 along with the user ID, and used as user management information.

If the simplified billing amount exceeds the balance in step S7, execution of the job is cancelled (step S13), and processing ends. Note that alternatively, job execution cancellation information may be generated as job log information, transmitted to the billing management server 200 along with the user ID, and used by the billing management server 200 as the user management information.

1-6. Job Processing Performed by the Billing Management Server 200

Figure 6:
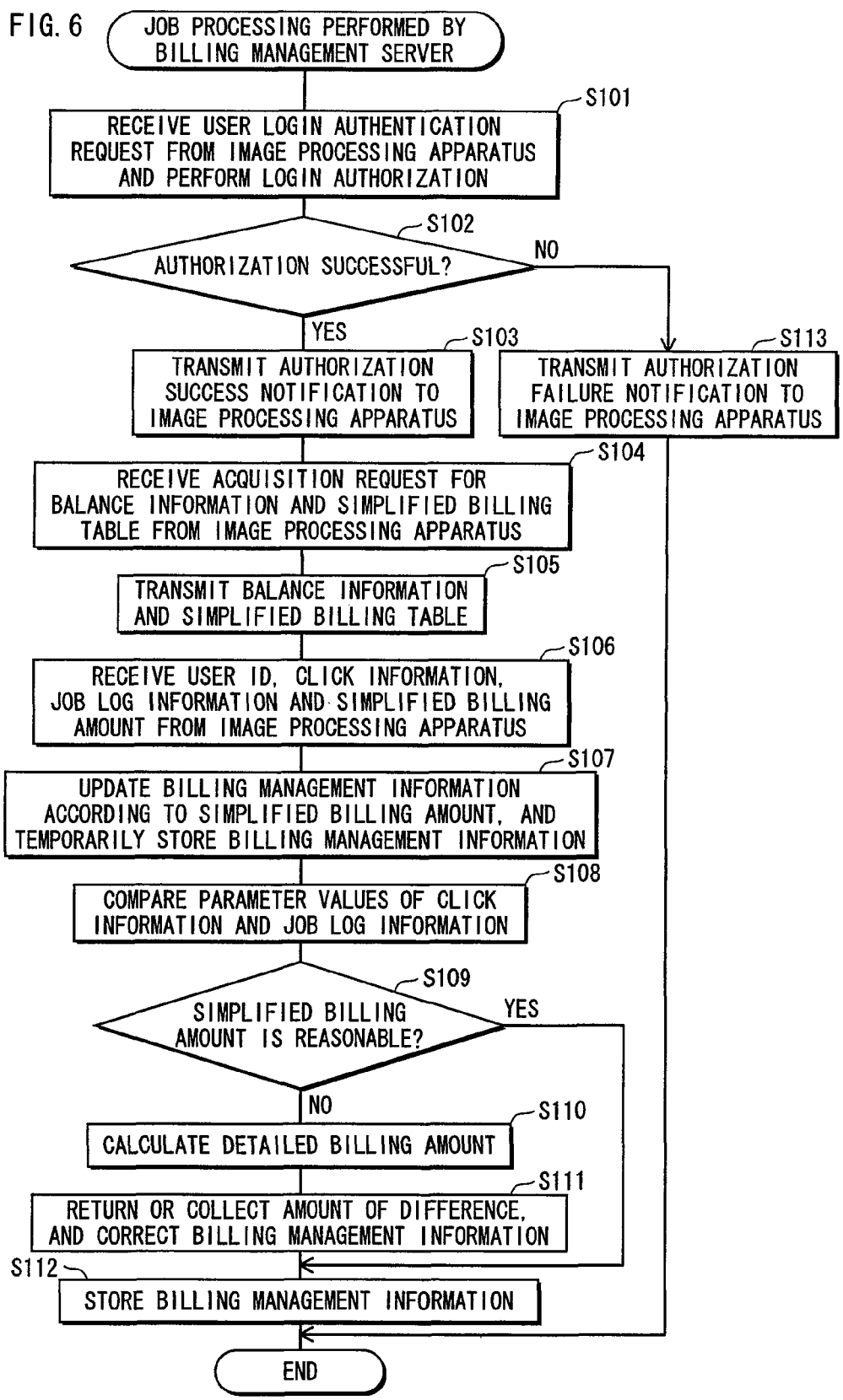
FIG. 6 is a flowchart showing job processing performed by the billing management server according to embodiment 1.

FIG. 6 is a flowchart showing job processing performed by the billing management server 200.

First, the billing management server 200 receives the user login information and the user login authorization request from the image processing apparatus 100, and performs login authorization by verifying whether there is a match with reference to the user ID and the password (step S101).

If authorization is successful, the billing management server 200 transmits an authorization success notification to the image processing apparatus 100 (step S102:YES, step S103).

Next, upon receiving the balance information and the simplified billing table acquisition request for the logged-in user from the image processing apparatus 100, the billing management server 200 transmits the requested balance information and simplified billing table to the image processing apparatus 100 (step S104, step S105).

After the job is executed, the billing management server 200 receives the user ID, the click information, the job log information, and the simplified billing amount from the image processing apparatus 100, updates the billing management information according to the received simplified billing amount, thus generating updated billing management information, and temporarily stores the updated billing management information in the EEPROM 215 (see FIG. 3) (step S106, S107) Next, the billing management server 200 compares the parameter values of the click information and the job log information, and determines whether the simplified billing amount is reasonable in view of actual conditions of the job (step S108, step S109).

If the parameter values of the click information and the job log information are not different, and the result of the determination is that the simplified billing amount is reasonable, the billing management information temporarily stored in the EEPROM 215 in step S107 is stored in the HDD 214 (see FIG. 3), and processing ends (step S109:YES, step S112).

If there is a difference between the parameter values of the click information and the job log information in step S109, and the result of the determination is that the simplified billing amount is not reasonable, the billing management server 200 reads a detailed billing table that has been stored in advance in the ROM 212 (see FIG. 3) of the billing management server 200, calculates the detailed billing amount according to the acquired job log information, returns or collects an amount of difference between the simplified billing amount and the detailed billing amount, and after correcting the billing management information temporarily stored in step S107, thus generating corrected billing management information, stores the corrected billing management information in the HDD 214 (see FIG. 3) (step S109:NO, step S110, step S111, step S112), and ends processing. Comparing the parameter values of the click information and the job log information in this way, and only calculating the detailed billing amount if there is a difference, has the effect of reducing the load on the billing management server 200 compared to a case in which the billing management server 200 calculates the detailed billing amount for all of the jobs. Note that the detailed billing table may be stored in the HDD 214 (see FIG. 3), or the medium that temporarily stores the billing management information in step S107 may be the HDD 214 (see FIG. 3).

If user login authorization fails in step S102, the billing management server 200 notifies the image processing apparatus 100 that authorization has failed (step S113), and processing ends. Here, the image processing apparatus 100 may create job log information according to the notification content and transmit the job log information along with the user ID to the billing management server 200. The job log information may be used as user management information in the billing management server 200.

FIG. 7 is an exemplary user billing management table. As shown in FIG. 7, the table is constituted from user IDs, passwords, and balance information. The authorization processor 216 (see FIG. 3) performs authorization processing by determining whether there is a match with reference to the user IDs and passwords in the table. Also, the billing manager 218 (see FIG. 3) acquires the balance information of the user according to the user ID with reference to the table.

FIG. 8 is an exemplary simplified billing table, and FIG. 9 is an exemplary detailed billing table. As illustrated by FIGS. 8 and 9, among the billing parameters of the detailed billing table, the simplified billing table is constituted only from the parameters anticipated to be most frequently used. Note that in the simplified billing table, the standard settings for copying and printing are normal paper as the sheet type, simplex as the printing mode, and normal as the image quality. All simplified billing amounts are calculated according to the standard settings of normal paper, simplex, and normal image quality. When transmitting a fax, the standard settings are A4 or under as the sheet size, normal as the image quality, and monochrome as the color mode, and all simplified billing amounts are calculated according to the standard settings of A4 or under, normal image quality, and monochrome. Note that the reason that 0 yen is the unit price for normal paper, simplex, and normal image quality when using the copy/print function in the detailed billing table of FIG. 9 is that such settings are already included as standard settings in the unit prices of the simplified billing table (see FIG. 8). Also, the −5 yen unit price for low image quality in the simplified billing table means that, since billing is performed according to the standard setting that is normal image quality, 5 yen per page will be returned when low image quality mode is used for printing. When using the fax transmission function, the reason that 10 yen per page is added when billing for a sheet size that is larger than A4 is that there is a possibility that output of the transmission target fax machine cannot accommodate a larger size than A4, and processing may be necessary to shrink the image data of the read document to fit within the A4 size, etc.

Here, in such cases as when billing according to toner use amount during use of the copy/print function, or when billing according to transmission time when transmitting a fax, returning or collecting a billing amount based on image quality is not necessary. When low image quality mode is used, the toner use amount is reduced when printing, and the fax transmission time is comparatively short since the data size is small, so in effect the billing amount is low, and since the reverse is also true in the high image quality mode, using the image quality mode parameter is not considered necessary. Also, although not noted in the exemplary simplified billing table shown in FIG. 8, a standard per-page toner use amount may be estimated, and set in the simplified billing table.

Note that the simplified billing table shown in FIG. 8 and the detailed billing table shown in FIG. 9 are examples, and the simplified and detailed billing tables are of course not limited to the conditions described above.

FIG. 10 shows exemplary click information, and FIG. 11 shows exemplary job log information. The sheet type is regular paper in the click information, and OHP sheet in the job log information. The job log information illustrates that although the simplified billing amount was calculated according to the unit price of normal paper, actually the OHP sheet was used. For this reason, a difference is detected when the parameter values of the click information and the job log information are compared in step S108 of FIG. 6, and in step S109, a determination is made that the simplified billing amount is not reasonable. Billing is performed correctly and the billing management information is updated in accordance with the detailed billing amount, which is calculated based on the job log information and the detailed billing table that specify use of the OHP sheet, rather than the simplified billing amount that specifies normal paper.

Note that whether a sheet is normal paper or an OHP sheet can be easily determined by using a method such as installing a sensor for measuring the transparency of a sheet in any spot between the feed cartridge and the paper ejection slot in the sheet conveyance path of the image processing apparatus.

FIG. 12 shows exemplary notification information transmitted from the image processing apparatus 100 to the billing management server 200 after the job is finished. The table is constituted from constituent elements of the notification information (user ID, click information, simplified billing amount, and job log information). Note that the notification information is not limited to the format shown in FIG. 12, and alternatively, the constituent elements may be transmitted separately to the billing management server 200. Note that in this case, a measure may be taken such as attaching a job ID, for identification, that is specific to each job, to all of the constituent elements, and then transmitting the constituent elements to the billing management server 200, for example.

Embodiment 2

Embodiment 2 aims to avoid a network communication load caused by transmitting job log information having a large file size each time a job is executed, for example during working hours when many users at an office or the like are using an image processing apparatus or an internal communication network. Since the overall structure, the structure of the image processing apparatus 100, and the structure of the billing management server 200 in the present embodiment are the same as in embodiment 1, detailed description thereof is omitted here.

2.1 Overview of Billing Management Processing 4

FIG. 13 is a schematic diagram of a flow of billing management processing according to embodiment 2.

Since (1) to (3) are the same as in FIG. 4, detailed description thereof is omitted here.

(4) The image processing apparatus 100 stores information pertaining to the executed job, and creates a job log ID that is information functioning as an index for specifying executed jobs, and is in correspondence with a respective piece of job log information. The timing of creating the job log ID may be a timing suited to the job type. For example, in the case of a print job, the job log ID may be created each time a series of print jobs is finished, and in the case of a fax communication job, the job log ID may be created each time a communication is finished regardless of whether there is a series of jobs.

(5) The image processing apparatus 100 transmits the user ID, the job log ID, the click information and the simplified billing amount to the billing management server 200.

(6) The billing management server 200 provisionally updates the billing management information according to the received simplified billing amount, thus creating provisionally updated billing management information.

(7) The billing management server 200 transmits a job log information acquisition request to the image processing apparatus 100 at a preset time such as during late-night hours.

(8) The image processing apparatus 100 transmits the requested job log information to the billing management server 200.

(9) The billing management server 200 compares the parameter values of the acquired job log information and the click information acquired in (5), and determines the reasonability of the simplified billing amount.

(10) If the simplified billing amount is reasonable, the provisionally updated billing management information is stored, and processing ends here. If not reasonable, the detailed billing amount is calculated according to the job log information, an amount of difference is returned or collected, the provisional billing management information provisionally updated in (6) is corrected and stored, and processing ends.

2-2. Job Processing Performed by the Image Processing Apparatus 100

Figure 14:
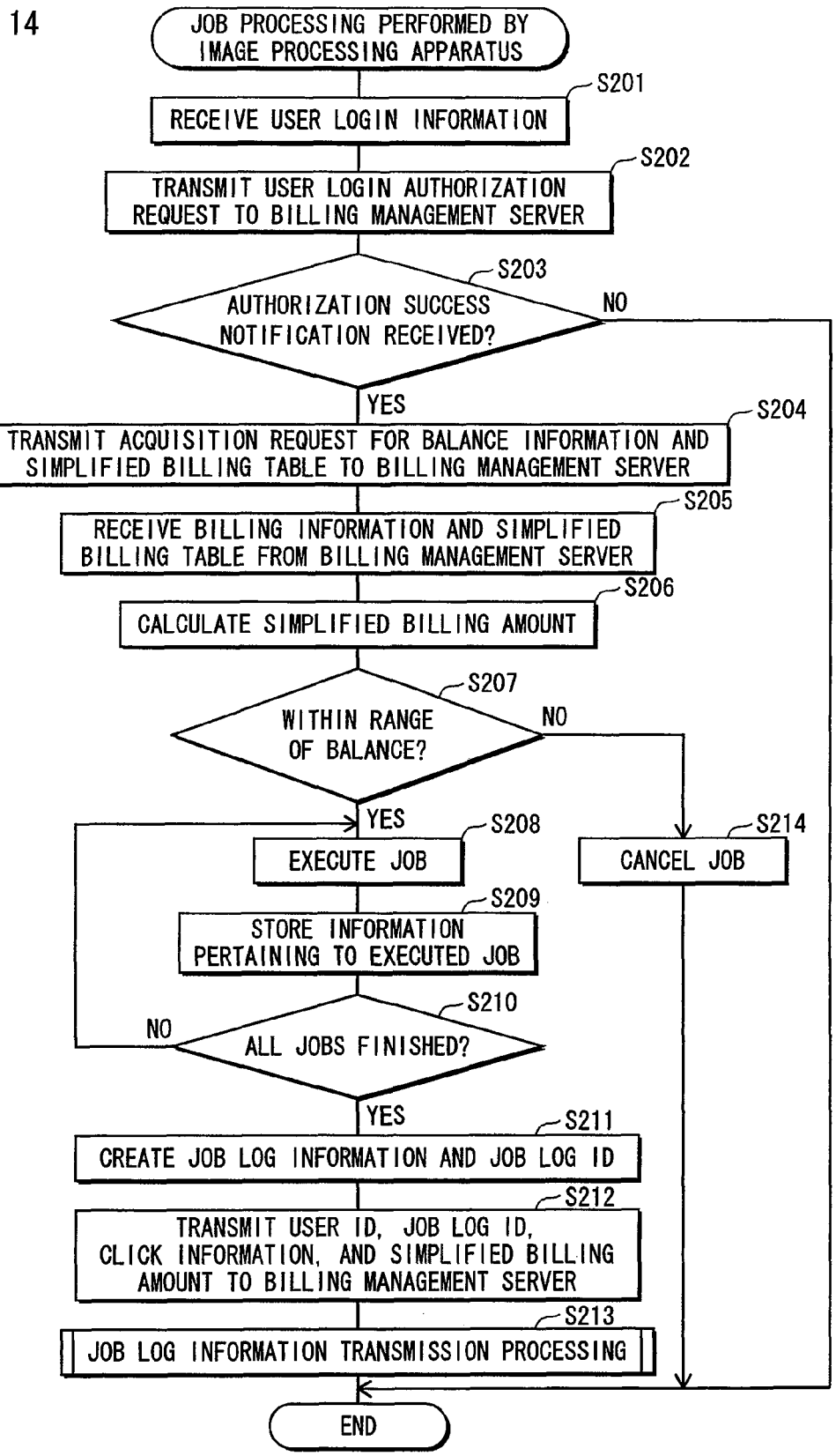
FIG. 14 is a flowchart showing job processing performed by the image processing apparatus according to embodiment 2.

FIG. 14 is a flowchart showing job processing performed by the image processing apparatus 100 according to embodiment 2.

Since steps S201 to S211 are the same as steps S1 to S11 in FIG. 5, detailed description thereof is omitted here.

In the image processing apparatus 100, after all jobs are finished, upon creation of the job log information and the job log ID (step S210:YES, step S211), the image processing apparatus 100 next transmits the user ID, the job log ID, the click information, and the simplified billing amount to the billing management server 200 (step S212).

Thereafter, the image processing apparatus 100 transmits the job log information to the billing management server 200, for example during late-night hours when network users at the office are few (step S213).

Figure 15:
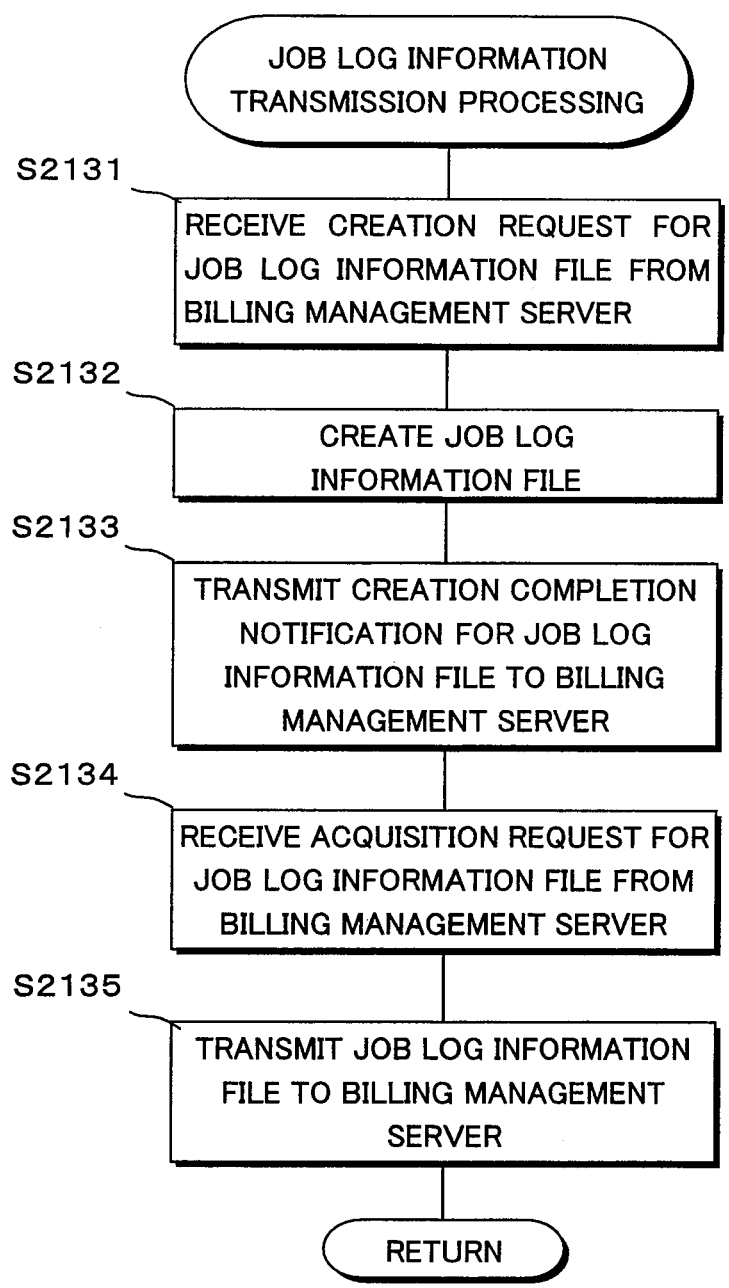
FIG. 15 is a flowchart showing a subroutine of job log information transmission processing in the flowchart of FIG. 14.

FIG. 15 is a flowchart showing a subroutine of job log information transmission processing of step S213. First, the image processing apparatus 100 receives a creation request for a job log information file transmitted from the billing management server 200 at a preset time, and creates the requested job log information file (step S2131, step S2132). When the job log information file creation is completed, the image processing apparatus 100 transmits a creation completion notification for the job log information file to the billing management server 200 (step S2133). In response, a job log information file acquisition request is transmitted from the billing management server 200 and received by the image processing apparatus 100. The image processing apparatus 100 transmits the requested job log information file to the billing management server 200 (step S2134, step S2135), returns to the main routine of FIG. 14, and processing ends.

Note that the job log information file creation request transmitted in step S2131 by the billing management server 200 may include, for each job log information file created by the image processing apparatus 100, a specification of a file format (XML, XLS, etc.) and an instruction indicating from which job to which job to include when creating the job log information file.

2-3. Job Processing Performed by the Billing Management Server 200

Figure 16:
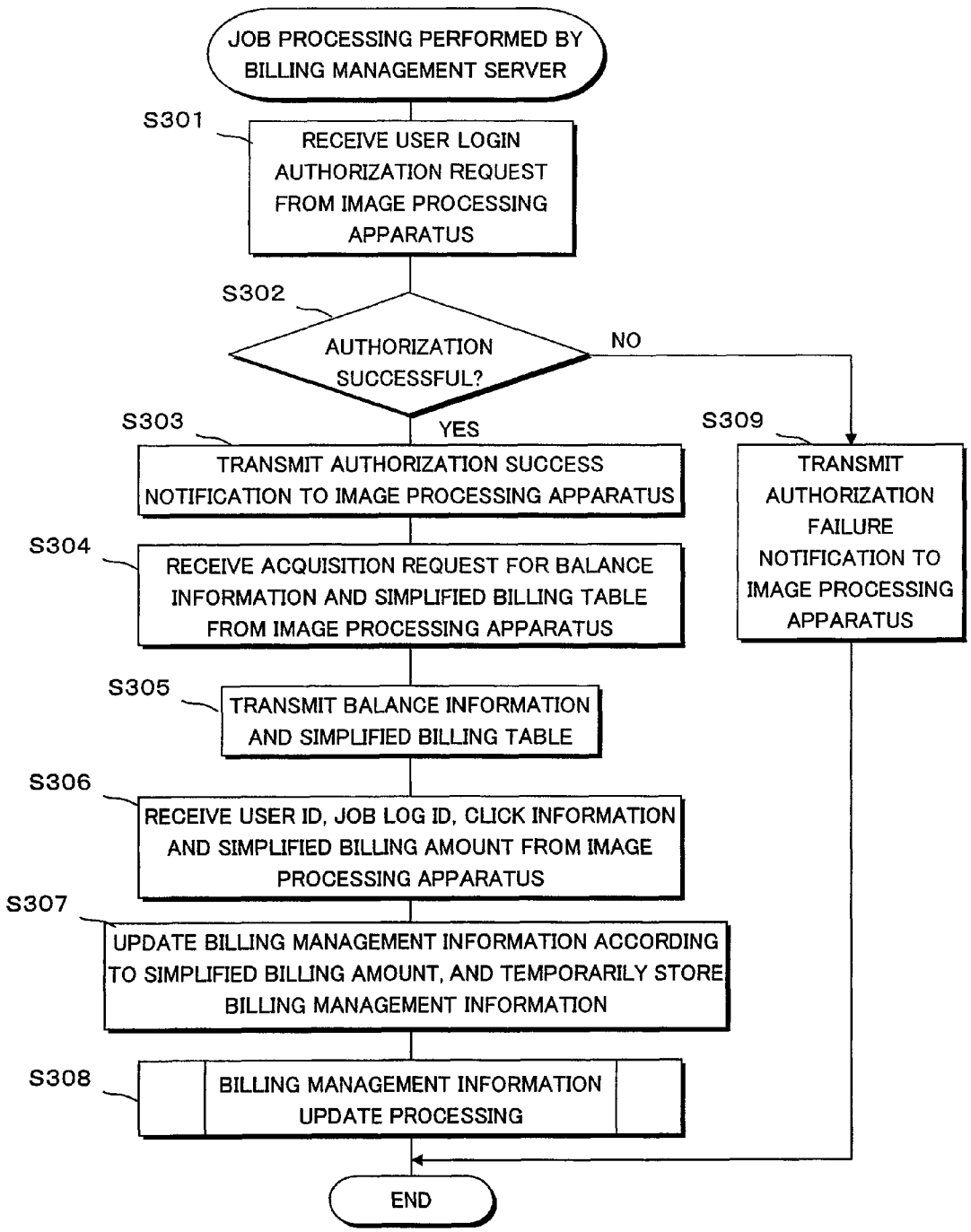
FIG. 16 is a flowchart showing job processing performed by the billing management server according to embodiment 2.

FIG. 16 is a flowchart showing job processing performed by the billing management server 200.

Since steps S301 to S305 are the same as steps S101 to S105 of FIG. 6, detailed description thereof is omitted here.

If the job is executed by the image processing apparatus 100, the billing management server 200 receives the job log ID, the user ID, the click information, and the simplified billing amount for the executed job from the image processing apparatus 100 (step S306). The billing management server updates the billing management information according to the received simplified billing amount, and temporarily stores the billing management information in the EEPROM 215 (see FIG. 3) (step S307). Note that here, the HDD 214 (see FIG. 3) may be used instead of the EEPROM 215 as the medium for temporary storage.

Thereafter, the billing management server 200 acquires the job log information from the billing management server 200, for example during the late-night hours when network users at the office are few, and performs a final update of the billing management information (step S308).

Figure 17:
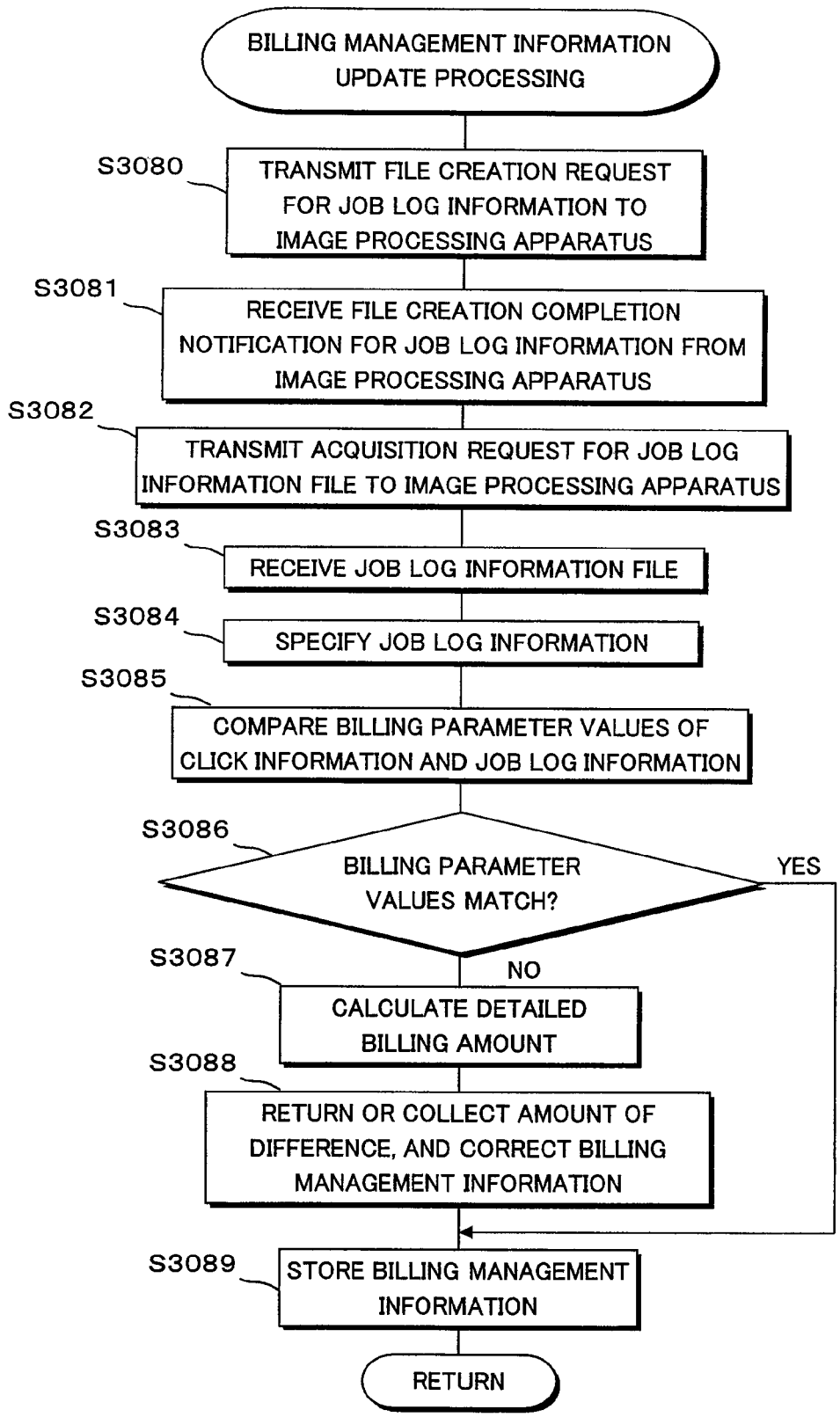
FIG. 17 is a flowchart showing a subroutine of billing management information update processing in the flowchart of FIG. 16.

FIG. 17 shows a subroutine for the billing management information update processing of step S308. First, the billing management server 200 requests the image processing apparatus 100 to create a job log information file at a preset time (step S3080). When the creation of the requested job log information file is completed, the billing management server 200 receives a creation completion notification transmitted from the image processing apparatus 100, and requests the image processing apparatus 100 to acquire the job log information file created next (step S3081, step S3082).

Upon receiving the job log information file transmitted from the image processing apparatus 100 according to the job log information file acquisition request, the billing management server 200 specifies a target piece of job log information in the received job log information file, according to the job log ID already acquired in step S306 (step S3083, step S3084).

Next, the billing management server 200 compares the billing parameter values of the click information already acquired in step S306 of FIG. 16 and the job log information specified in step S3084 (step S3085) If the billing parameter values of the click information match the billing parameter values of the job log information, the simplified billing amount is determined to be reasonable in view of the actual conditions of the job, the billing management information temporarily stored during step S307 of FIG. 16 is stored in the HDD 214 (see FIG. 3) as the actual billing management information (step S3086:YES, step S3089), and processing returns to the main routine of FIG. 16.

If there is a difference between the parameter values of the click information and the job log information, the simplified billing amount is determined not to be reasonable. The billing management server 200 calculates the detailed billing amount according to the detailed billing table pre-stored in the ROM 212 (see FIG. 3) and the job log information, returns or collects a difference between the simplified billing amount and the detailed billing amount, corrects the billing management information temporarily stored during step S307 of FIG. 16, thus creating corrected billing management information, and stores the corrected billing management information in the HDD 214 (step S3086:NO, step S3087, step S3088, step S3089). Processing returns to the main routine of FIG. 16.

FIG. 18 shows exemplary notification information transmitted from the image processing apparatus 100 to the billing management server 200 after the job is finished, according to the present embodiment. The table is constituted from the constituent elements of the notification information (user ID, job log ID, click information, and simplified billing amount). Note that the notification information is not limited to the format shown in FIG. 18, and alternatively, the constituent elements may be transmitted separately to the billing management server 200. Note that in this case, a job ID that is specific to each job may be attached for identification to all of the constituent elements, thus causing the billing management server 200 to easily recognize that the constituent elements pertain to the same job.

Embodiment 3

Embodiment 3 is an embodiment used, for example, when an image processing job such as an image conversion job that is not performed by the image processing apparatus 100 is performed by using a service (hereinafter referred to as an "external service") provided by an external apparatus such as a server, or when the image processing apparatus executes an image processing job in tandem with the external service. The following describes the present embodiment with reference to the drawings. Note that in the present embodiment, e.g. when a plurality of image processing apparatuses are connected in the system, to eliminate the possibility of confusion and error as much as possible in regards to which image processing apparatus's job is in tandem with the job executed by the external service providing server, the billing management server 200 and an external service providing server 400 are not directly connected, and instead perform all communication including billing processing via the image processing apparatus 100.

3-1. Overall Structure

Figure 19:
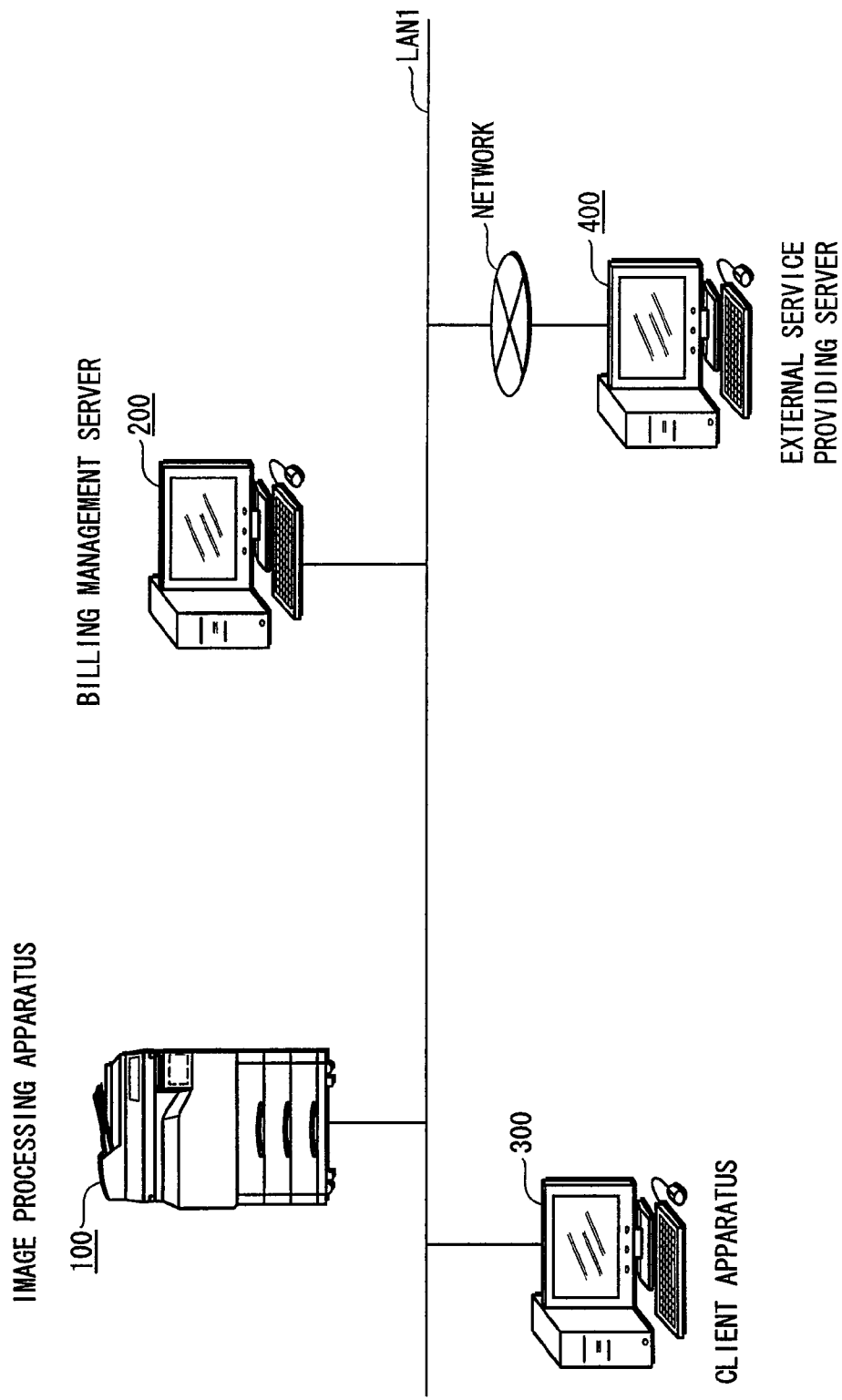
FIG. 19 shows a general structure of an image processing system according to embodiment 3.

FIG. 19 shows the general structure of the image processing system according to the present embodiment.

As shown in FIG. 19, the system of the present embodiment is formed by connecting the external service providing server 400 via a network to the system described in embodiments 1 and 2.

Since the image processing apparatus 100, the billing management server 200, and the client apparatus 300 are the same as in embodiments 1 and 2, detailed description is omitted here.

The external service providing server 400, via the image processing apparatus 100, or in tandem with the image processing apparatus 100, provides the service of executing jobs that the image processing apparatus 100 does not execute. Specifically, the service is, for example, converting image data scanned by the image processing apparatus 100 to a file format that can be used by a spreadsheet software (such as Microsoft Excel) or a document editing software (such as Microsoft Word).

3-2. Structure of the Service Providing Server 400

Figure 20:
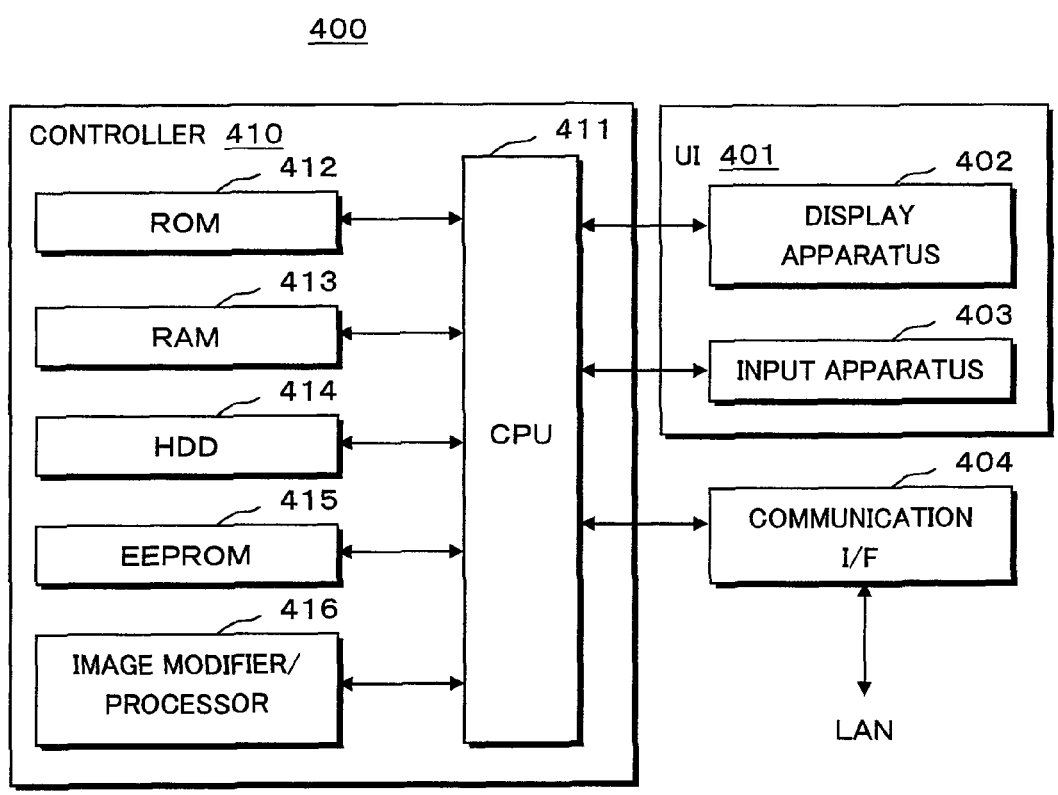
FIG. 20 is a schematic block diagram of a controller in an external service providing server.

FIG. 20 is a block diagram of the general structure of the service providing server 400. As shown in FIG. 20, the external service providing server 400 includes a user interface (UI) 401, an I/F 404, etc., and these constituent elements are each connected to a controller 410.

The UI 401 is constituted from a display apparatus 403 and an input apparatus 403, and in cases such as when an error occurs during execution of a job, or when an administrator performs maintenance, the display apparatus 402 displays error messages and maintenance information, and the input apparatus 403 provides an input interface to an administrator for maintenance and resolving the causes of errors.

The communication I/F 404 in the external service providing server 400 places and receives orders for jobs between the external service providing server 400 and the image processing apparatus 100 via a network such as the Internet, a LAN or a WAN (Wide Area Network), and performs transmission and reception of job data, billing tables, job log information, billing amounts, etc.

As main constituent elements, the controller 410 includes a CPU 411, a ROM 412, a RAM 413, an HDD 414, an EEPROM 415, an image modifier/processor 416, etc.

Simplified billing tables and detailed billing tables for the service provided by the external service providing server 400 are stored in the ROM 412, and application programs necessary for image modification and image processing, etc. are also stored in the ROM 412. The CPU 411 reads and starts up the programs when necessary. The RAM 413 is used as the work area of the CPU 411.

The EEPROM 415 temporarily stores job information, etc. transmitted from the image processing apparatus 100.

The image modifier/processor 416 executes the image modification/processing job requested by the image processing apparatus 100. Note that the functions of the image modifier/processor 416 need not be fulfilled by a stand-alone device, and may instead be fulfilled by a unit formed by combining the CPU 411 with one or more devices selected from among a ROM 412, a RAM 413, an HDD 414, and an EEPROM 415.

3-3. Overview of Billing Management Processing when Using an External Service

Figure 21:
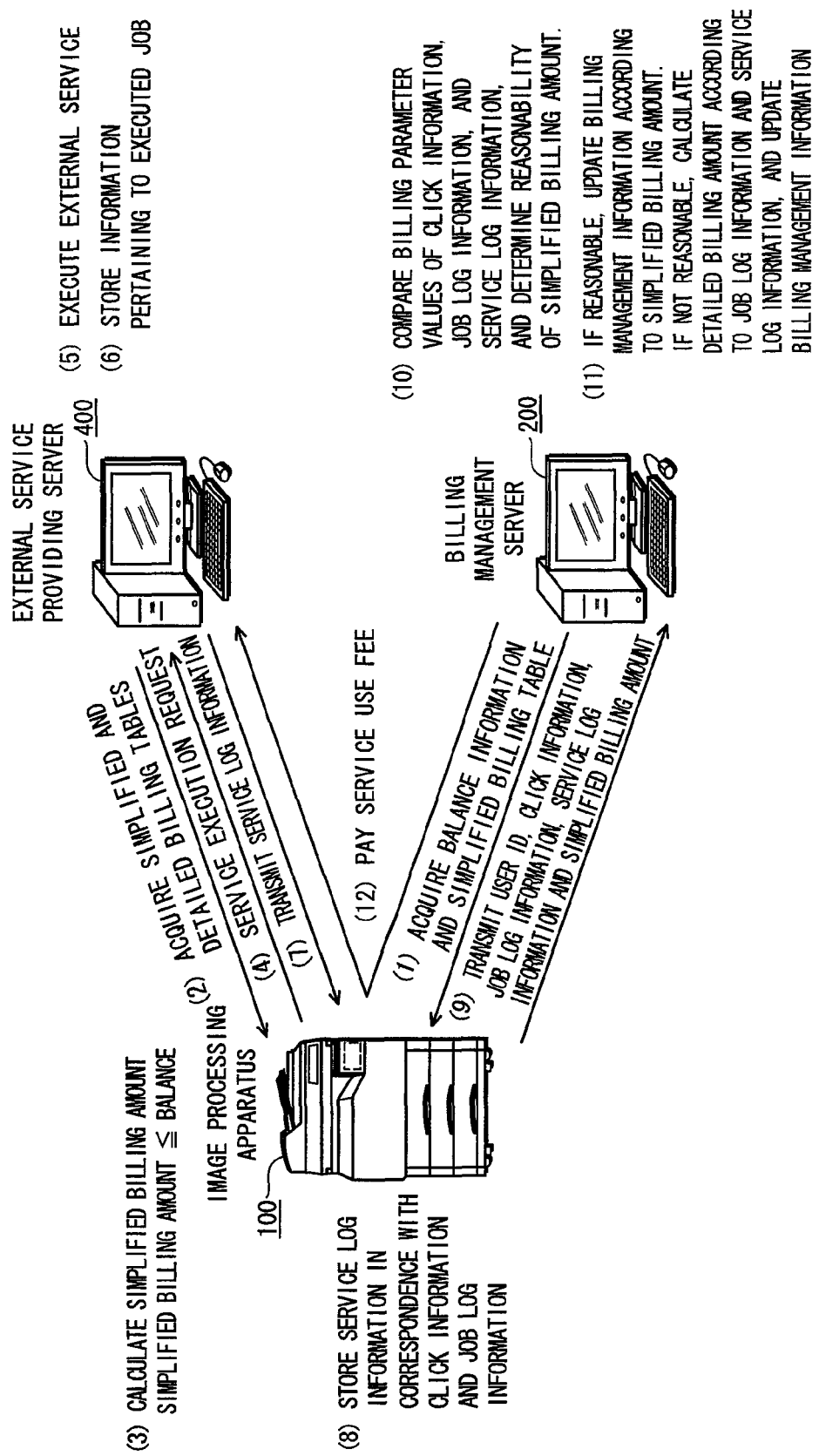
FIG. 21 is a schematic diagram of a flow of billing management processing according to embodiment 3.

FIG. 21 is a schematic diagram of a flow of billing management processing according to embodiment 3.

(1) First, when the user logs in, the image processing apparatus 100 downloads balance information of the user and a simplified billing table (for the image processing apparatus 100) for the user from the billing management server 200.

(2) Next, the image processing apparatus 100, after receiving the job from the user, downloads the simplified and detailed billing tables for the external service from the desired external service providing server 400, and transmits the detailed billing table to the billing management server 200.

(3) The image processing apparatus 100 calculates the simplified billing amount according to the acquired simplified billing table (for the image processing apparatus 100 and the external service providing server 400), the settings selected by the user, and the number of pages to be processed.

(4) If the simplified billing amount is within the range of the balance, the image processing apparatus 100 executes the job, and also transmits a job execution command to the external service providing server 400. Note that depending on the content of the job, there are cases in which the image processing apparatus only transmits the job execution command to the external service providing server 400, and does not execute the job.

(5) The external service providing server 400 executes the job requested by the image processing apparatus 100 (hereinafter, a job executed by the external service providing server 400 is referred to as a "service job").

(6) When execution of the service job is finished, the external service providing server 400 stores detailed information pertaining to the executed service job (hereinafter referred to as "service log information").

(7) The external service providing server 400 transmits the service log information to the image processing apparatus 100.

(8) The image processing apparatus 100 correlates and stores the received service log information, the user ID, the click information, the simplified billing amount, and the job log information (when there is a job executed by the image processing apparatus 100).

(9) The image processing apparatus 100 transmits the service log information, the user ID, the click information, the simplified billing amount, and the job log information (when there is a job executed by the image processing apparatus 100) to the billing management server 200.

(10) The billing management server 200 updates the billing management information according to the received simplified billing amount, thus generating updated billing management information, and temporarily stores the updated billing management information. Furthermore, the billing management server 200 compares the parameter values of the acquired click information, service log information and job log information (when there is a job executed by the image processing apparatus 100), and determines whether the simplified billing amount is reasonable in view of the actual conditions of the job.

(11) If the result of the determination is that the simplified billing amount is reasonable, the billing management server 200 stores the billing management information updated according to the simplified billing amount. If determined not to be reasonable, the billing management server 200 calculates the detailed billing amount according to the job log information, returns or collects the difference between the calculated detailed billing amount and the simplified billing amount, corrects and stores the billing management information.

(12) The billing management server 200 determines an external service use fee according to the result of (11), and pays the service use fee to the external service providing server 400 via the image processing apparatus 100.

3-4. Job Processing Performed by the Image Processing Apparatus 100

Figure 22:
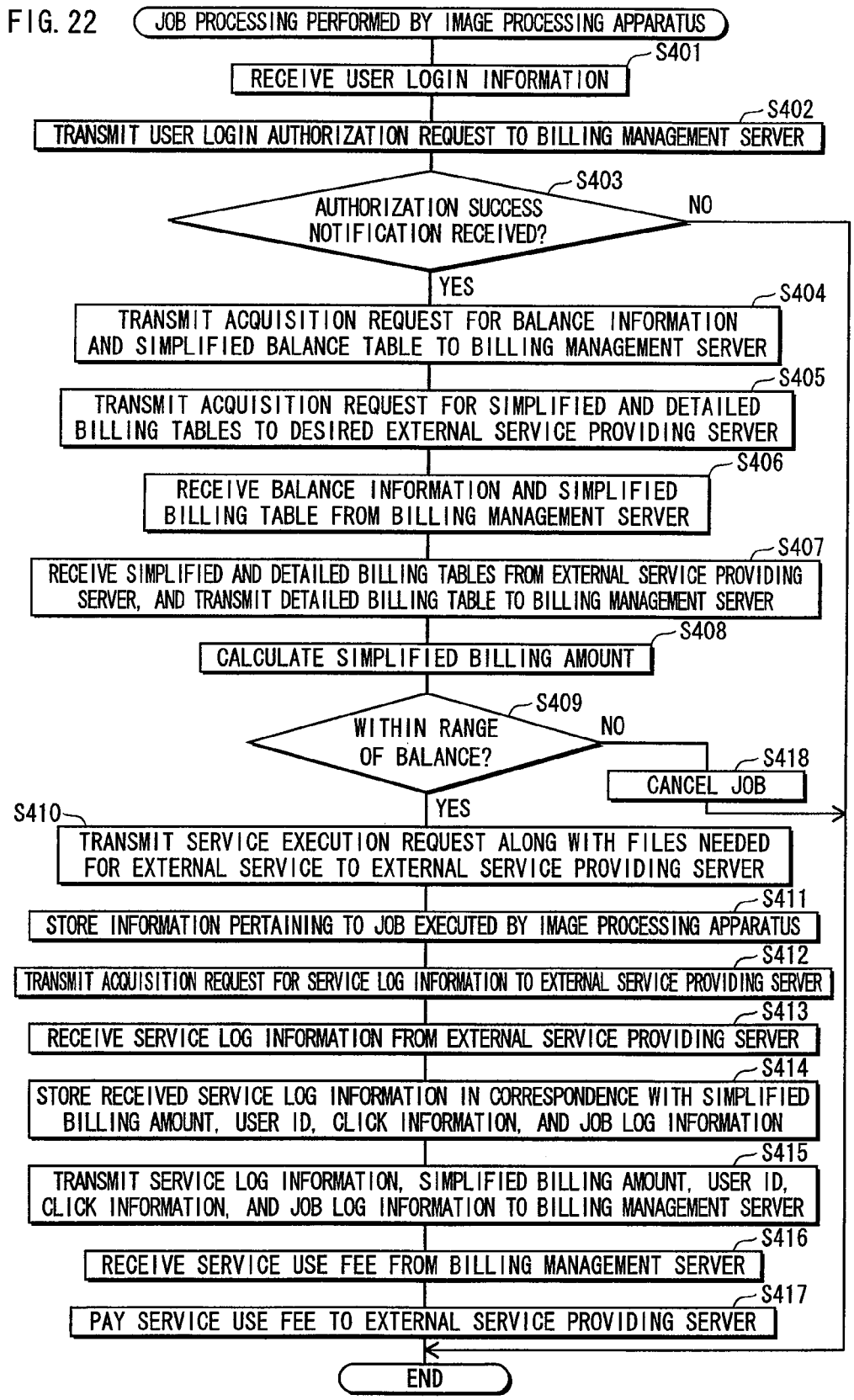
FIG. 22 is a flowchart showing job processing performed by the image processing apparatus of embodiment 3.

FIG. 22 is a flowchart showing job processing performed by the image processing apparatus 100 of embodiment 3.

Since steps S401 to S403 are the same as steps S1 to S3 of FIG. 5, detailed description is omitted here.

If user login authorization on the billing management server 200 in step S403 is successful, the image processing apparatus 100 transmits an acquisition request for the balance information and the simplified billing table for the user to the billing management server 200 (step S403:YES, step S404). Next, after receiving the job from the user, the image processing apparatus 100 transmits an acquisition request for the simplified and detailed billing tables for the desired external service to the external service providing server 400 (step S405).

The image processing apparatus 100 receives the balance information and the simplified billing table transmitted from the billing management server 200 in accordance with the request in step S404 (step S406).

The image processing apparatus 100 receives the simplified and detailed billing tables transmitted from the external service providing server 400 in accordance with the request in step S405, and transmits the detailed billing table to the billing management server 200 (step S407).

The image processing apparatus 100 calculates the simplified billing amount according to the simplified billing tables received from the billing management server 200 and the external service providing server 400, and determines whether the simplified billing amount is within the range of the balance (step S408, step S409).

If the simplified billing amount is within the range of the balance, the image processing apparatus 100 executes a job such as a scan job, thus obtaining an image file, and transmits a service execution request to the external service providing server 400 along with the obtained image file (step S409:YES, step S410). Note that unless a job is executed in the image processing apparatus 100 with use of only the external service, e.g. when an image file stored in a memory in the image processing apparatus 100 is used to execute the job, the image processing apparatus 100 simply transmits the service execution request along with necessary files to the external service providing server 400.

Next, information pertaining to the job executed by the image processing apparatus 100 is stored (step S411), and the image processing apparatus 100 transmits an acquisition request for service log information to the external service providing server 400 (step S412). Note that if there is not a job executed by the image processing apparatus 100, step S411 is omitted.

Upon receiving the service log information transmitted by the service providing server 400 (step S413), the image processing apparatus 100 stores the user ID, the click information, the simplified billing amount, and the job log information (when there is a job executed by the image processing apparatus 100) in correspondence with the service log information (step S414), and transmits the stored information to the billing management server 200 (step S415).

The image processing apparatus 100 receives the service use fee calculated by the billing management server 200 from the billing management server 200, pays the service use fee to the external service providing server 400 (step S416, step S417), and processing ends.

If user login authorization fails in step S403 (the user success notification is not received) (step S403:NO), processing ends.

If the simplified billing amount exceeds the balance in step S409, the job is immediately cancelled (step S409:NO, step S418), and processing ends.

3-5. Job Processing Performed by the External Service Providing Server 400

Figure 23:
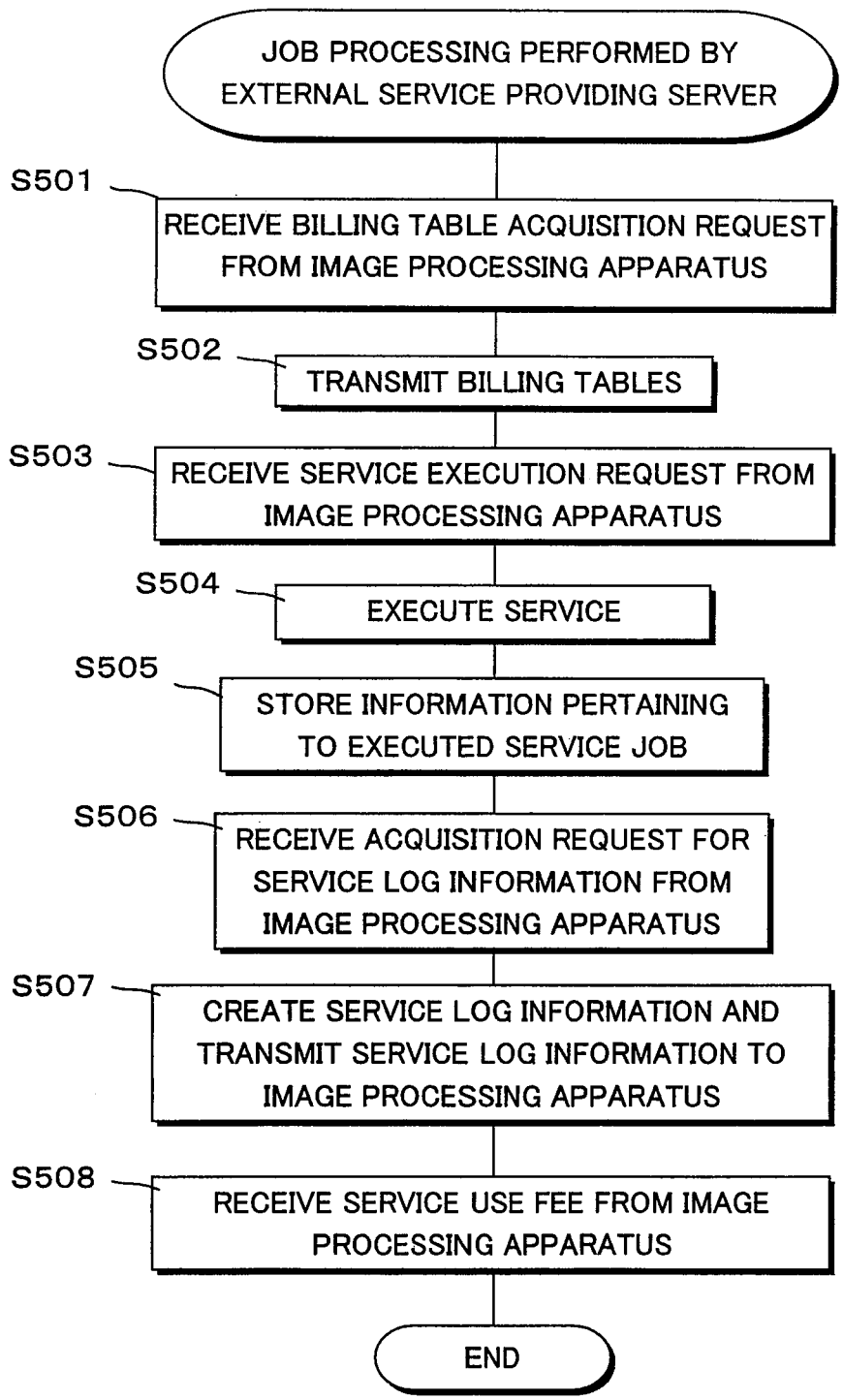
FIG. 23 is a flowchart showing job processing performed by the service providing server according to embodiment 3.

FIG. 23 is a flowchart showing job processing performed by the external service providing server 400 according to embodiment 3.

First, the external service providing server 400 receives the acquisition request for the simplified and detailed billing tables from the image processing apparatus 100, and transmits the two types of requested billing tables to the image processing apparatus 100 (step S501, step S502).

Next, the external service providing server 400 receives the service execution request from the image processing apparatus 100, and after executing the service, stores information pertaining to the executed job (step S503, step S504, step S505).

Upon receiving the service log information acquisition request from the image processing apparatus 100, the external service providing server 400 creates the service log information, and transmits the service log information to the image processing apparatus 100 (step S506, step S507).

Lastly, the external service providing server receives the service use fee from the image processing apparatus 100 (step S508), and processing ends.

3-6. Job Processing Performed by the Billing Management Server 200

Figure 24:
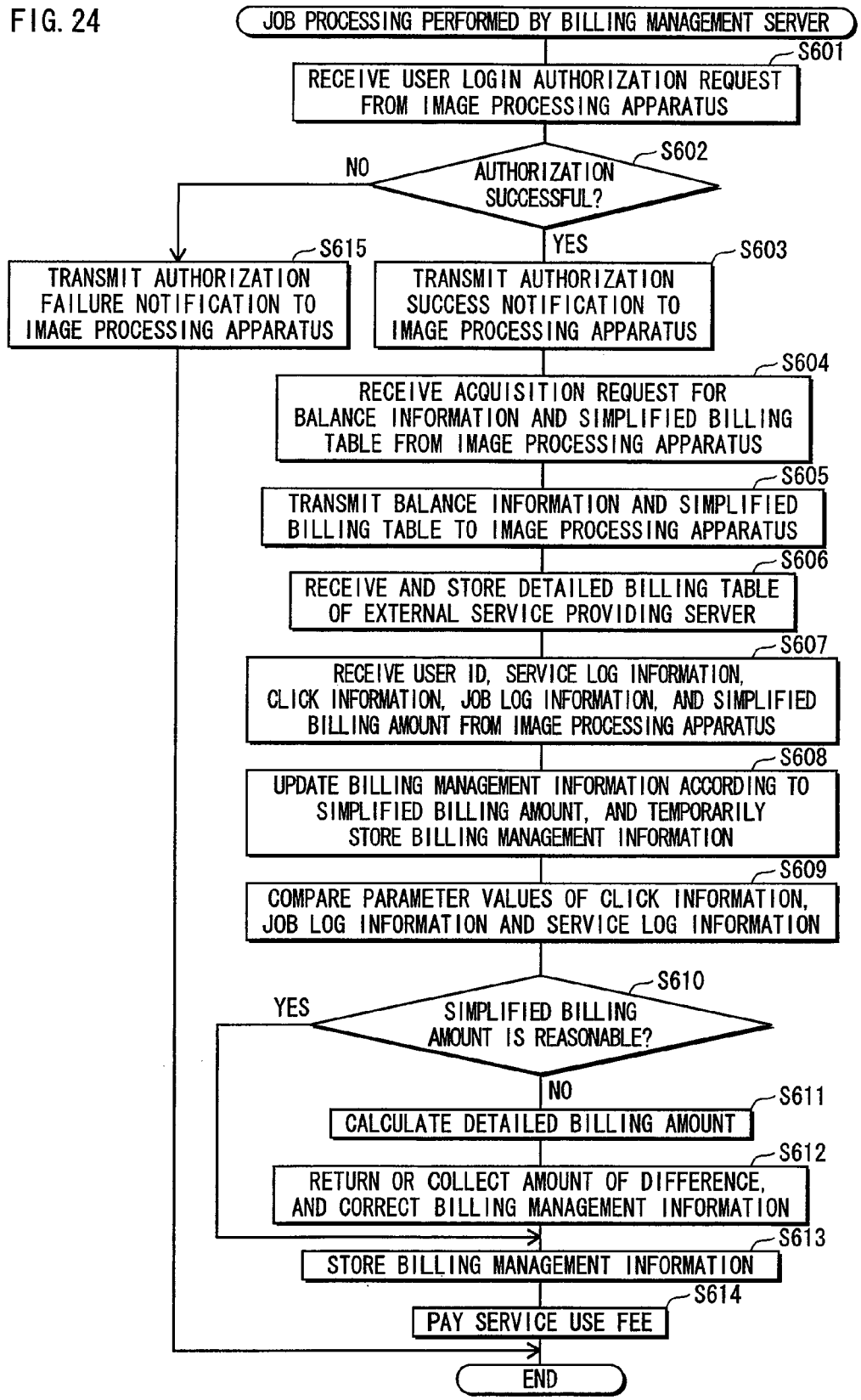
FIG. 24 is a flowchart showing job processing, performed by a billing management server according to embodiment 3.

FIG. 24 is a flowchart showing job processing performed by the billing management server 200 according to embodiment 3.

Since steps S601 to S605 are the same as steps S101 to S105 in FIG. 6, detailed description thereof is omitted here.

After transmitting, in step S605, the balance information and the simplified billing table requested by the image processing apparatus 100, the billing management server 200 receives the detailed billing table of the external service providing server from the image processing apparatus 100, and stores the detailed billing table in the EEPROM 215 (see FIG. 3) (step S606). Note that here, the HDD 214 (see FIG. 3) may be used as the medium for storing the detailed billing table of the external service providing server. Also, step S606 may be a step performed immediately before step S604 or step S605.

After the job is executed by the image processing apparatus 100 and the external service providing server 400, the billing management server 200 receives the user ID, the service log information, the click information, the job log information, and the simplified billing amount from the image processing apparatus 100 (step S607), updates the billing management information according to the received simplified billing amount, and temporarily stores the billing management information in the EEPROM 215 (see FIG. 3) (step S608) Note that here, the HDD 214 (see FIG. 3) may be used instead of the EEPROM 215 as the medium for temporarily storage.

Next, the billing management server 200 compares the parameter values of the click information, the job log information, and the service log information, and determines whether the simplified billing amount is reasonable in view of the actual conditions of the job (step S609). If the simplified billing amount is reasonable, the billing management information temporarily stored in step S608 is stored as the actual billing management information in the HDD 214 (see FIG. 3), the billing management server 200 pays the service use fee to the external service providing server 400 via the image processing apparatus 100 (step S610:YES, step S613, step S614), and processing ends. If the simplified billing amount is determined not to be reasonable, the billing management server 200 calculates the detailed billing, amount according to the detailed billing table pre-stored in the ROM 212 (see FIG. 3), and the detailed billing table received in step S606, job information and service log information of the external service providing server 400. The billing management server 200 returns or collects the amount of difference between the detailed billing amount and the simplified billing amount, corrects the billing management information temporarily stored in step S608, thus generating corrected billing management information, and stores the corrected billing management information in the HDD 214 (FIG. 3) (step S610:NO, step S611, step S612, step S613). Finally, the billing management server 200 pays the service use fee to the external service providing server 400 via the image processing apparatus 100 (step S614), and processing ends.

If user login authorization fails in step S602, the authorization failure notification is transmitted to the image processing apparatus 100 (step S602:NO, step S615), and processing ends.

If the simplified billing amount is determined to be reasonable in step S610, the billing management information temporarily stored in step S608 is stored as the actual billing management information in the HDD 214 (see FIG. 3), the billing management server 200 pays the service use fee to the external service providing server 400 via the image processing apparatus 100 (step S610:YES, step S613, step S614), and processing ends.

FIG. 25 is an exemplary simplified billing table of the external service providing server 400, and FIG. 26 is an exemplary detailed billing table of the external service providing server 400. As illustrated by FIGS. 25 and 26, the simplified billing table includes only the parameters that are anticipated to be used frequently from among the billing parameters of the detailed billing table. For both the conversion to Excel service and the conversion to Word service, the standard setting for color mode is monochrome in the simplified billing table, and all simplified billing amounts are calculated with use of the monochrome setting.

FIG. 27 shows exemplary click information according to embodiment 3. Per-page billing amounts are listed for information pertaining to a scan job executed by the image processing apparatus 100, and information pertaining to the conversion to Excel service executed by the external service providing server 400, respectively.

FIG. 28 shows exemplary service log information transmitted from the external service providing server 400 to the image processing apparatus 100 according to embodiment 3. The "service providing server" item of FIG. 28 shows a URL of a website that displays the services of the external service providing server 400 on the Internet. However, the identification of the server is not limited to being a URL, and any information such as an ID, a number, a symbol, an IP address, etc. may fulfill a similar function, provided that the information can specify the external service providing server 400.

FIG. 29 shows exemplary notification information transmitted from the image processing apparatus 100 to the billing management server 200 after the print job is finished, according to the present embodiment. A table is constituted from the constituent elements of the notification information (user ID, job log information, and service log information). Note that the notification information is not limited to the format shown in FIG. 29, and alternatively, the constituent elements may be transmitted separately to the billing management server 200. Note that in this case, a job ID for identification that is specific to each job may be attached to all of the constituent elements to cause the billing management server 200 to easily recognize the constituent elements as pertaining to the same job.

The structure of the three embodiments described above enables achieving the effects of quickly performing a judgment as to whether the simplified billing amount (provisional fee) is within the range of the balance, calculating the detailed billing amount (actual fee) according to more detailed information, and performing correct billing while suppressing costs. Such effects are achieved since the simplified billing table (first billing table) used for calculating the simplified billing amount is less detailed and includes less information than the detailed billing table (second billing table) used for calculating the detailed billing amount, and therefore the load on the CPU when calculating the provisional fee is comparatively small. As a result, the simplified billing amount can be calculated quickly, while suppressing the costs of designing a high-speed CPU or a large-capacity recording medium. Furthermore, detailed billing can also be performed since the detailed billing amount is calculated according to the detailed billing table that includes more detailed billing information than the simplified billing table, and the balance information is updated according to the detailed billing amount.

Here, similar effects can be achieved when the present invention is realized as a billing control method used by the above-described apparatus, or as a recording medium on which a program for realizing the method has been recorded.

Variations

Although described based on the above embodiments, the present invention is of course not limited to such embodiments. Variations such as the following are also included in the present invention.

(1) In embodiments 1 to 3 described above, provisional billing is performed by the billing management server 200 according to the simplified billing amount calculated by the image processing apparatus 100, the provisional billing management information is updated and temporarily stored, and after the job is finished, the billing management information is corrected as necessary according to the detailed billing amount and stored as the actual billing management information. However, the present embodiment is not limited to this. For example, the simplified billing amount may be used only for determining whether to cause the image processing apparatus to cancel the job. In this case, after finishing the job, only the actual billing according to the detailed billing amount is performed. Performing provisional billing, updating the provisional information in the billing management server 200, and correcting the billing management information are not necessary.

This method of only updating the billing management information in the billing management server 200 according to the detailed billing amount is particularly effective when billing according to toner use amount when using the copy/print function, and billing according to transmission time when transmitting a fax, since the correct information is not known until the job is finished.

Furthermore, since the billing information is not updated according to the provisional billing information, comparing the parameter values of the click information and the job log information is not necessary. As a result, after the job is finished, the click information can be excluded from the notification information transmitted from the image processing apparatus 100 to the billing management server 200, thereby reducing the amount of transmission data and further reducing the load on the network.

(2) In embodiments 1 to 3, before starting the job, the simplified billing amount is obtained, a determination is made that the simplified billing amount is within the range of the balance, and a determination is made as to whether to permit or cancel execution of the job. However, the present invention is not limited to this, and may be as described below. Specifically, each time one page of the image processing job is executed, the image processing apparatus 100 may calculate the simplified billing amount for the page and add the amount to a cumulative total. If the cumulative total reaches the upper limit of the balance, the image processing apparatus 100 may stop executing the job and transmit the job log information for all processed pages to the billing management server 200. This enables more high-precision billing management and job execution control to be performed, even in cases such as when jobs having different sheet sizes and color modes coexist in a single series of jobs.

(3) Although in embodiment 3, the two types of billing table received from the external service providing server are the simplified billing table and the detailed billing table, the present invention is not limited to this. The billing tables received from the external service providing server may be only one type. Specifically, the distinction between simplified and detailed may be eliminated, and only one billing table prepared. In this case, the comparison between the parameter values is only performed in regards to jobs executed by the image processing apparatus 100. Specifically, the image processing apparatus 100 may compare only the parameter values of the click information and the job log information.

(4) Although in embodiments 1 to 3, the image processing apparatus 100 acquires a simplified billing table (second billing table) from the billing management server 200, the present embodiment is not limited to this, and the image processing apparatus 100 may obtain a simplified billing table stored in a memory device such as the ROM 112 or the EEPROM 215 of the image processing apparatus 100.

Figure 30:
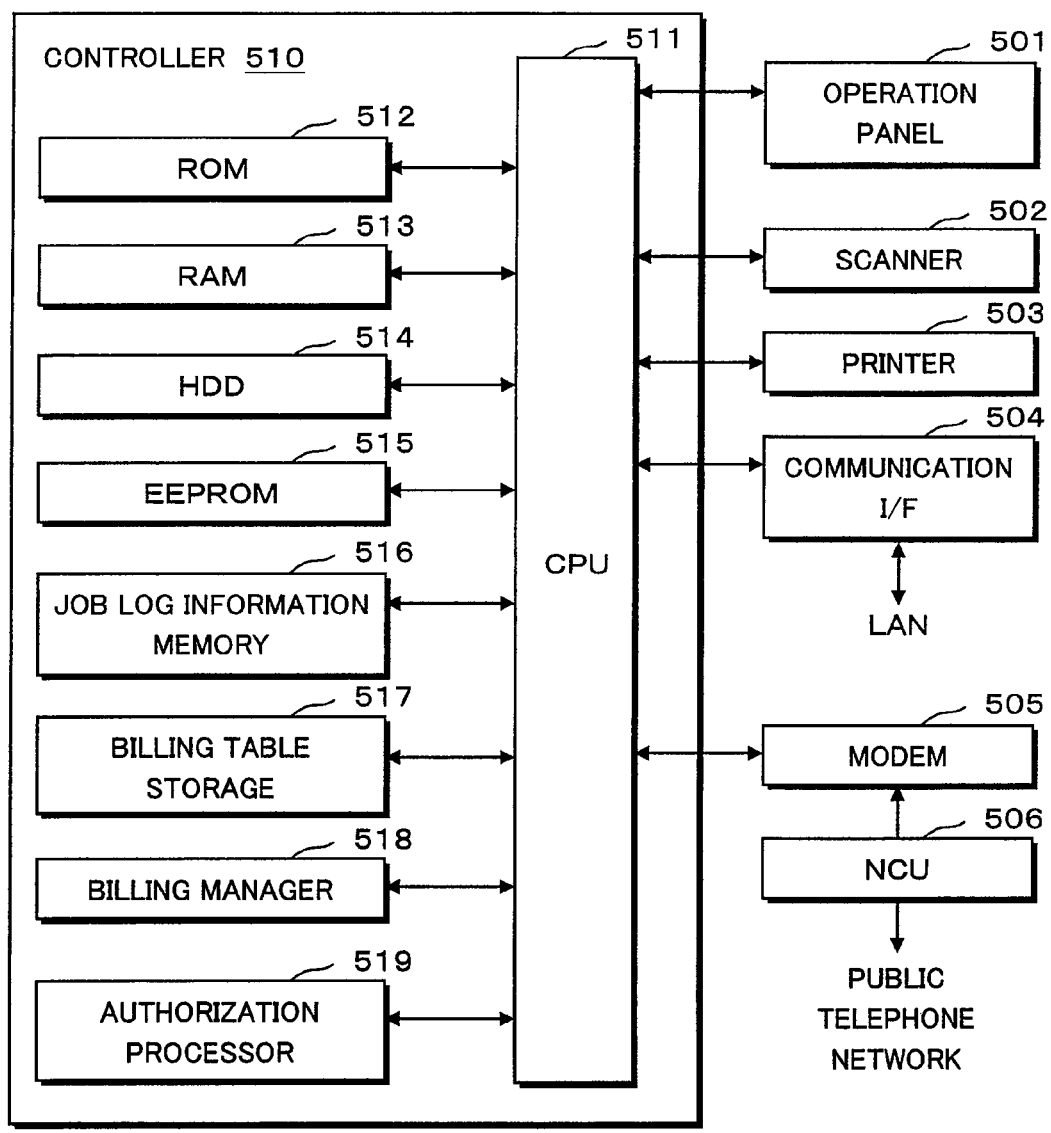
FIG. 30 is a schematic block diagram of a controller in an image processing apparatus according to variation (5).

(5) Although in embodiments 1 to 3, the image processing apparatus 100 and the billing management server 200 are provided separately in stand-alone devices, the structure of the image processing apparatus 100 may also have the function of the billing management server 200. In this case, the image processing apparatus 100 alone can fulfill the function of the image processing system described in embodiments 1 to 3. FIG. 30 shows a block structure of a controller of an image processing apparatus according to the present variation. Since an operation panel 501, a scanner 502, a printer 503, a communication I/F 504, a modem 505, an NCU 506, a CPU 511, a ROM 512, a RAM 513, an HDD 514, a job log information memory 516, a billing table storage 517, and a billing management unit 518 are similar to the operation panel 101, the scanner 102, the printer 103, the communication I/F 104, the modem 105, the NCU 106, the CPU 111, the ROM 112, the RAM 113, the HDD 114, the job log information memory 116, the billing table storage 117, and the billing manager 118 shown in FIG. 2, and an authorization processor 519 is similar to the authorization processor 216 shown in FIG. 3, detailed description is omitted here. An EEPROM 515 temporarily stores user login information, job log information, user billing information, etc.

(6) The program pertaining to the billing control processing in the above embodiments may be recorded on magnetic tape, a magnetic disk such as a flexible disk, an optical recording medium such as CD-ROM, DVD-ROM, MO, or PD, or a computer-readable recording medium such as a flash memory-type recording medium such as Smart Media (registered trademark) or COMPACTFLASH (registered trademark). The program may be produced and transferred in the form of the recording medium, and may also be transferred or distributed in the form of the program via wired or wireless networks including the Internet, broadcast, electronic communication lines, satellite communications, etc.

Also, it is not necessary for the program for realizing the present invention to include all of the modules for causing a computer to perform the above-described processing, and the various types of processing in the present invention can be caused to be executed on a computer with use of various general-purpose programs that can be installed on a separate information processing apparatus such as a program included in a communication program or an operating system (OS), etc.

Also, the present invention may be any combination of the above embodiments and variations.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A processor load management system including an image processing apparatus that executes an image processing job and a server that performs billing of the image processing job according to a first billing table, the image processing apparatus being connected to the server via a network, the image processing apparatus comprising a first processor that:
acquires a balance from the server;
executes the image processing job;
acquires a second billing table, wherein items of the second billing table are fewer than items of the first billing table;
performs a provisional fee calculation that calculates, before or during execution of the image processing job, a provisional fee required for executing the image processing job, according to the second billing table, the provisional fee calculation having a first computational load on the first processor;
compares the balance and the provisional fee, and cancels the image processing job if a judgment is made as a result of the comparison that the image processing job cannot be executed within the balance; and
transmits, to the server, information for calculating a fee pertaining to the image processing job based on the first billing table in the server, and the server comprising a second processor that:
receives via the network, from the image processing apparatus, the information pertaining to the executed job;
performs a detailed fee calculation that calculates an actual fee according to the received information pertaining to the executed job, with reference to the first billing table, the detailed fee calculation having a second computational load on the second processor greater than the first computational load on the first processor;
updates the balance according to the calculated actual fee and generates an updated balance; and
stores the updated balance in a memory, wherein the detailed fee calculation performed by the second processor reduces computational load on the first processor.

2. The processor load management system of claim 1, wherein
the second processor further:
acquires information pertaining to the provisional fee from the image processing apparatus; and
determines whether the information pertaining to the executed job includes an element causing a difference between billing amounts calculated according to the first and second billing tables,
if the element causing the difference between the billing amounts is included, the second processor calculates an actual fee and updates the balance, and
if the element is not included, the second processor treats the provisional fee as the actual fee.

3. The processor load management system of claim 1, wherein
each time an image processing job is complete, the second processor calculates the actual fee and updates the current balance.

4. The processor load management system of claim 1, wherein
the second billing table comprises constituent elements that are limited to main items.

5. The processor load management system of claim 2, wherein
the second processor further:
calculates the actual fee at a predetermined time,
provisionally updates the balance with use of the provisional fee before the predetermined time, and
updates the balance by correcting the provisional balance according to the calculated actual amount after the predetermined time.

6. The processor load management system of claim 4, wherein
the first processor:
assigns an identical piece of job identification information to both the provisional fee generated for the image processing job, and the information pertaining to the image processing job; and
notifies the provisional fee and the corresponding job identification information to the server each time an image processing job is successfully completed, and
second processor, at a predetermined time, acquires, from the image processing apparatus, the information pertaining to the image processing job specified in the job identification information, and calculates the actual fee.

7. The processor load management system of claim 2, wherein
as the image processing job, the first processor executes at least one of a copy job, a print job, and a fax transmission job, and
the element in the first and second billing tables that causes the difference between billing amounts is at least one of toner use amount information, sheet size information, and fax transmission time information.

8. The processor load management system of claim 1, wherein
the image processing apparatus is further connected via a network to an external service providing apparatus that provides an image processing service, and the first processor:
acquires information pertaining to the executed job from the external service providing apparatus if the job has been executed with use of the external service providing apparatus; and
acquires information pertaining to a billing table of the job executed by the external service providing apparatus, and
in addition to, or in place of, billing of the executed job performed by the image processing apparatus calculated according to the first and second billing tables, the first processor and the second processor calculate, respectively, the provisional fee and the actual fee of the job executed by the external service providing apparatus, with reference to the information pertaining to the job and information pertaining to the billing condition.

9. An image processing apparatus that executes an image processing job, in a processor load management system including the image processing apparatus and a server that performs billing, with reference to a first billing table, of the image processing job executed by the image processing apparatus, the image processing apparatus being connected to the server via a network, comprising a processor that:
acquires a balance from the server via the network;
executes the image processing job;
acquires a second billing table, wherein items of the second billing table are fewer than items of the first billing table;
performs a provisional fee calculation that calculates, before or during execution of the image processing job, a provisional fee required for executing the image processing job, according to the second billing table, the provisional fee calculation having a first computational load on the processor;
compares the balance and the provisional fee, and cancels the image processing job if a judgment is made as a result of the comparison that the image processing job cannot be executed within the balance; and
transmits via the network, to the server, information for performing a detailed fee calculation for calculating a detailed fee, on a second processor in the server, pertaining to the image processing job, the detailed fee calculation having a second computational load on the second processor greater than the first computational load on the processor,
wherein the detailed fee calculation performed by the second processor reduces computational load on the processor.

10. A control method executed by an image processing apparatus comprising a processor that executes an image processing job, in a processor load management system including the image processing apparatus and a server that performs billing, with reference to a first billing table, of the image processing job executed by the processor of the image processing apparatus, the image processing apparatus being connected to the server via a network, the control method comprising:
acquiring, using the network, a balance from the server;
acquiring, using the network, a second billing table, wherein items of the second billing table are fewer than items of the first billing table;
performs a provisional fee calculation for calculating, using the processor, before or during execution of the image processing job, a provisional fee required for executing the image processing job, according to the second billing table, the provisional fee calculation having a first computational load on the processor;
comparing, using the processor, the balance and the provisional fee, and canceling the image processing job if a judgment is made as a result of the comparison that the image processing job cannot be executed within the balance; and transmitting, using the network, to the server, information for performing a detailed fee calculation for calculating a detailed fee, on a second processor in the server, pertaining to the image processing job, the detailed fee calculation having a second computational load on the second processor greater than the first computational load on the processor, wherein the detailed fee calculation performed by the second processor reduces computational load on the processor.

11. A non-transitory recording medium on which has been recorded a processor load management program executed by an image processing apparatus comprising a processor that executes an image processing job, in a processor load management system including the image processing apparatus and a server that performs billing, with reference to a first billing table, of the image processing job executed by the image processing apparatus, the image processing apparatus being connected to the server via a network, the processor load management program causing the following processing to be executed on the processor in the image processing apparatus:

balance acquisition processing for acquiring a balance from the server via the network;

second billing table acquisition processing for acquiring a second billing table, wherein items of the second billing table are fewer than items of the first billing table;

provisional fee calculation processing for, before or during execution of the image processing job, calculating a provisional fee required for executing the image processing job, according to the second billing table, the provisional fee calculation having a first computational load on the processor;

canceling processing for comparing the balance and the provisional fee, and canceling the image processing job if a judgment is made as a result of the comparison that the image processing job cannot be executed within the balance; and transmitting processing for transmitting, to the server via the network, information for performing a detailed fee calculation for calculating a detailed fee, on a second processor in the server, pertaining to the image processing job, the detailed fee calculation having a second computational load on the second processor greater than the first computational load on the processor, wherein the detailed fee calculation performed by the second processor reduces computational load on the processor.

12. An image processing apparatus that performs billing of an executed image processing job, comprising a processor that:

executes the image processing job;

stores a balance in a memory;

stores a first billing table and a second billing table, wherein items of the second billing table are fewer than items of the first billing table;

before or during execution of the image processing job, performs a provisional fee calculation that calculates a provisional fee required to execute the image processing job according to the second billing table, compares the balance and the provisional fee, and cancels the image processing job if a judgment is made as a result of the comparison that the image processing job cannot be executed within the balance, the provisional fee calculation having a first computational load on the processor; and when the image processing job has been executed, performs an actual fee calculation that calculates an actual fee for the executed image processing job according to the first billing table, and update the balance in the memory, the actual fee calculation having a second computational load on the processor greater than the first computational load, wherein the actual fee calculation performed after the job has been executed reduces computational load on the processor during the image processing job.

13. A control method for billing an image processing job executed by a processor of an image processing apparatus that holds a first billing table and a second billing table, wherein items of the second billing table are fewer than items of the first billing table, the method comprising:

acquiring a balance;

performing a provisional fee calculation for calculating a provisional fee before or during execution of the image processing job, the provisional fee calculation having a first computational load on the processor;

canceling execution of the image processing job if a judgment is made as a result of the comparison that the image processing job cannot be executed by a user within the balance of the user;

when the image processing job has been executed, performing an actual fee calculation that calculates an actual fee of the image processing job that has been executed, according to the first billing table, the actual fee calculation having a second computational load on the processor greater than the first computational load; and updating a balance according to the calculated actual fee, wherein the actual fee calculation performed after the job has been executed reduces computational load on the processor during the processing job.

14. A non-transitory recording medium on which is recorded a processor load management program for billing an image processing job executed by a processor of an image processing apparatus that stores a first billing table and a second billing, wherein items of the second billing table are fewer than items of the first billing table, the processor load management program causing the following processing to be executed on the processor:

balance acquisition processing for acquiring a balance;

provisional fee calculation processing for calculating a provisional fee before or during execution of the image processing job, the provisional fee calculation having a first computational load on the processor;

canceling processing for canceling execution of the image processing job if a judgment is made as a result of the comparison that the image processing job cannot be executed by a user within the balance of the user;

actual fee calculation processing for, when the image processing job has been executed, calculating an actual fee of the image processing job that has been executed, according to the first billing table, the actual fee calculation having a second computational load on the processor greater than the first computational load; and update processing for updating a balance according to the calculated actual fee, wherein the actual fee calculation performed after the job has been executed reduces computational load on the processor during the image processing job.

15. A server that performs billing of an image processing job executed on an image processing apparatus according to a first billing table, the server comprising a processor that:
  transmits, to the image processing apparatus, a balance and a second billing table, wherein items of the second billing table are fewer than items of the first billing table so that the image processing apparatus performs a provisional fee calculation that calculates a provisional fee required for executing the image processing job in the image processing apparatus, the provisional fee calculation having a first computational load on a processor in the image processing apparatus;
  receives an information pertaining to the executed job from the image processing apparatus;
  performs an actual fee calculation, with a second processor in the server, that calculates an actual fee according to the received information pertaining to the executed job, with reference to the first billing table, the actual fee calculation having a second computational load on the processor greater than the first computational load;
  updates the balance according to the calculated actual fee and generate an updated balance;
  stores the updated balance in a memory,
  wherein the actual fee calculation performed on the second processor reduces computational load on the processor.

16. The server of claim 15, wherein
the processor further:
  acquires information pertaining to the provisional fee from the image processing apparatus; and
  determines whether the information pertaining to the executed job includes an element causing a difference between billing amounts calculated according to the first and second billing tables,
  if the element causing the difference between the billing amounts is included, the processor calculates an actual fee and updates the balance, and
  if the element is not included, the processor treats the provisional fee as the actual fee.

17. The server of claim 15, wherein
each time an image processing job is complete, the processor calculates the actual fee and updates the current balance.

18. The server of claim 15, wherein
the second billing table comprises constituent elements that are limited to main items.

19. A non-transitory computer readable medium on which is recorded a processor load management program for billing an image processing job executed by a processor of a server that stores a first billing table and a second billing table, wherein items of the second billing table are fewer than items of the first billing table, the processor load management program causing the following processing to be executed on the processor:
  transmit a balance and a second billing table, wherein items of the second billing table are fewer than items of the first billing table so that the image processing apparatus performs a provisional fee calculation that calculates a provisional fee required for executing the image processing job in the image processing apparatus, the provisional fee calculation having a first computational load on a processor in the image processing apparatus;
  receive an information pertaining to the executed job from the image processing apparatus;
  performs an actual fee calculation, with a second processor in the server, that calculates an actual fee according to the received information pertaining to the executed job, with reference to the first billing table, the actual fee calculation having a second computational load on the processor greater than the first computational load;
  update the balance according to the calculated actual fee and generate an updated balance;
  store the updated balance in a memory,
  wherein the actual fee calculation performed on the second processor reduces computational load on the processor.

20. The non-transitory computer readable medium of claim 19, the processor load program further causing the following processing to be executed on the processor:
  acquires information pertaining to the provisional fee from the image processing apparatus; and
  determines whether the information pertaining to the executed job includes an element causing a difference between billing amounts calculated according to the first and second billing tables,
  if the element causing the difference between the billing amounts is included, the processor calculates an actual fee and updates the balance, and
  if the element is not included, the processor treats the provisional fee as the actual fee.

21. The non-transitory computer readable medium of claim 19, wherein each time an image processing job is complete, the processor calculates the actual fee and updates the current balance.

22. The non-transitory computer readable medium of claim 19, wherein the second billing table comprises constituent elements that are limited to main items.

* * * * *